(12) United States Patent
Bugni

(10) Patent No.: US 12,246,789 B1
(45) Date of Patent: Mar. 11, 2025

(54) FOOT PEG ELEVATIONAL SYSTEM FOR SELF-PROPELLED TWO-WHEELED VEHICLES

(71) Applicant: Charles Dominic Bugni, Cle Elum, WA (US)

(72) Inventor: Charles Dominic Bugni, Cle Elum, WA (US)

( * ) Notice: Subject to any disclaimer, the term of this patent is extended or adjusted under 35 U.S.C. 154(b) by 0 days.

(21) Appl. No.: 18/830,529

(22) Filed: Sep. 10, 2024

(51) Int. Cl.
   *B62J 25/06*         (2020.01)
(52) U.S. Cl.
   CPC ..................... *B62J 25/06* (2020.02)
(58) Field of Classification Search
   CPC ........................................ B62J 25/06
   See application file for complete search history.

(56) References Cited

U.S. PATENT DOCUMENTS

| | | | | |
|---|---|---|---|---|
| 1,261,442 A * | 4/1918 | Rigby | ..................... | B62J 25/04 74/564 |
| 4,203,500 A * | 5/1980 | Kamiya | ................... | B62H 1/12 180/219 |
| 5,090,715 A * | 2/1992 | Nakajima | ................ | B62J 25/04 280/166 |
| 11,807,330 B2 * | 11/2023 | Bank | ...................... | B62K 11/04 |
| 2022/0017174 A1 * | 1/2022 | Bank | ....................... | B62J 25/04 |

* cited by examiner

*Primary Examiner* — Karen Beck
*Assistant Examiner* — Hosam Shabara
(74) *Attorney, Agent, or Firm* — Grandview Law

(57) ABSTRACT

For a self-propelled two-wheeled vehicle including a seat with a reference point, a footpeg elevational system includes a first footpeg pivotally couplable to the self-propelled two-wheeled vehicle, the first footpeg including a distal end; and a second footpeg pivotally couplable to the self-propelled two-wheeled vehicle, the second footpeg including a distal end; wherein the first footpeg is mechanically linked to the second footpeg so that when the first footpeg and second footpeg are pivotally coupled to the self-propelled two-wheeled vehicle, the distal end of the first footpeg becomes closer to the reference point of the seat of the self-propelled two-wheeled vehicle when the distal end of the second footpeg becomes farther from the reference point of the seat of the self-propelled two-wheeled vehicle. In addition, other aspects are described in the claims, drawings, and text forming a part of the present disclosure.

14 Claims, 43 Drawing Sheets

FOOT PEG ELEVATIONAL SYSTEM FOR SELF-PROPELLED TWO-WHEELED VEHICLES

SUMMARY

In one or more aspects a two-wheeled vehicle footpeg elevational system for a two-wheeled vehicle including a seat with a reference point includes (I) a first footpeg pivotally couplable to the two-wheeled vehicle, the first footpeg including a distal end; and (II) a second footpeg pivotally couplable to the two-wheeled vehicle, the second footpeg including a distal end, wherein the first footpeg is coupled with the second footpeg such that when the first footpeg and second footpeg are pivotally coupled to the two-wheel vehicle, the distal end of the first footpeg becomes closer to the reference point of the seat of the two-wheeled vehicle when the distal end of the second footpeg becomes farther from the reference point of the seat of the two-wheeled vehicle.

In implementations when the first footpeg and second footpeg are pivotally coupled to the two-wheel vehicle, when no force is being imparted upon the first footpeg, and when no force is being imparted upon the second footpeg, then the first footpeg and the second footpeg are equidistant from the reference point of the seat of the two-wheeled vehicle.

In implementations when the first footpeg and second footpeg are pivotally coupled to the two-wheel vehicle, when a first force is being imparted on the first footpeg, and a second force is being imparted on the second footpeg then the distal end of the first footpeg is closer to the reference point of the seat of the two-wheeled vehicle than the distal end of the second footpeg is to the reference point of the seat of the two-wheeled vehicle when the second force is greater than the first force.

In implementations when the first footpeg and second footpeg are pivotally coupled to the two-wheel vehicle, when a first force is being imparted on the first footpeg, and a second force is being imparted on the second footpeg then the distal end of the first footpeg is closer to the reference point of the seat of the two-wheeled vehicle than the distal end of the second footpeg is to the reference point of the seat of the two-wheeled vehicle when the second force is greater than the first force by a threshold amount based at least in part on at least one material friction coefficient.

In implementations when the first footpeg and second footpeg are pivotally coupled to the two-wheel vehicle, when a first force is being imparted on the first footpeg, and a second force is being imparted on the second footpeg then the distal end of the first footpeg is farther from the reference point of the seat of the two-wheeled vehicle than the distal end of the second footpeg is to the reference point of the seat of the two-wheeled vehicle when the second force is less than the first force.

In implementations when a first force is imparted on the first footpeg and a second force is being imparted on the second footpeg then the distal end of the first footpeg is farther from the reference point of the seat of the two-wheeled vehicle than the distal end of the second footpeg is to the reference point of the seat of the two-wheeled vehicle when the second force is less than the first force by a threshold amount based at least in part on at least one spring force constant.

In implementations the two-wheeled vehicle footpeg elevational system further includes a first arm assembly pivotally couplable with the two-wheeled vehicle, and a second arm assembly pivotally couplable with the two-wheeled vehicle, wherein when the first arm assembly is pivotally coupled with the two-wheeled vehicle, the first footpeg is pivotally coupled to the two-wheel vehicle the being coupled to the first arm assembly, and wherein when the second arm assembly is pivotally coupled with the two-wheeled vehicle, the second footpeg is pivotally coupled to the two-wheel vehicle by being coupled to the second arm assembly.

In implementations the first arm assembly includes a first inner arm member and a first outer arm member, wherein the first inner arm member is slidably coupled at least partially inside the first outer arm member configured to at least partially be extended out from the first outer arm member in a first position and to at least partially be contracted into the first outer arm member in a second position, wherein the second arm assembly includes a second inner arm member and a second outer arm member, and wherein the second inner arm member is slidably coupled at least partially inside of the second outer arm member configured to at least partially be extended out from the second outer arm in a first position and to at least partially be contracted into the second outer arm member in a second position.

In implementations the first arm assembly includes at least one first lubricant portion, wherein the first inner arm member has at least one exterior surface portion, wherein the first outer arm member has at least one interior surface portion in juxtaposition with the at least one exterior surface portion of the first inner arm member, wherein the at least one first lubricant portion is positioned between the at least one exterior surface portion of the first inner arm member and the at least one interior surface portion of the first outer arm member, wherein the second arm assembly includes at least one second lubricant portion, wherein the second inner arm member has at least one exterior surface portion, wherein the second outer arm member has at least one interior surface portion in juxtaposition with the at least one exterior surface portion of the second inner arm member, and wherein the at least one second lubricant portion is positioned between the at least one exterior surface portion of the second inner arm member and the at least one interior surface portion of the second outer arm member.

In implementations the first inner arm member has at least one exterior lubricant surface portion, wherein the first outer arm member has at least one interior lubricant surface portion adjacent with the at least one exterior lubricant surface portion of the first inner arm member, wherein the second inner arm member has at least one exterior lubricant surface portion, and wherein the second outer arm member has at least one interior lubricant surface portion adjacent with the at least one exterior lubricant surface portion of the second inner arm member.

In implementations the two-wheeled vehicle footpeg elevational system further includes a first bracket support couplable to the two-wheeled vehicle, and a second bracket support couplable to the two-wheeled vehicle, wherein when the first bracket support and the second bracket support are coupled to the two-wheeled vehicle and when the distal end of the first footpeg and the distal end of the second footpeg are equidistant to the reference point of the seat of the two-wheeled vehicle then the first arm assembly is in contact with the first bracket support and the second arm assembly is in contact with the second bracket support.

In implementations the first footpeg and the second footpeg are coupled so that when the first footpeg and second footpeg are pivotally coupled to the two-wheel vehicle, when a first force is being imparted on the first footpeg, and a second force is being imparted on the second footpeg then the first force opposes the second force upon the second footpeg and the second force opposes the first force upon the first footpeg.

In implementations the two-wheeled vehicle footpeg elevational system further includes a cable having a first end and a second end, wherein when the first footpeg is pivotally coupled with the two-wheeled vehicle, the first footpeg is coupled with first end of the cable, and wherein when the second footpeg is pivotally coupled with the two-wheeled vehicle, the second footpeg is coupled with the second end of the cable.

In implementations the two-wheeled vehicle footpeg elevational system further includes at least one pulley member couplable with the two-wheeled vehicle, wherein when the first footpeg is pivotally coupled with the two-wheeled vehicle, when the second footpeg is pivotally coupled with the two-wheeled vehicle, and when the at least one pulley member is coupled with the two-wheeled vehicle, the cable is movably coupled with the at least one pulley member.

In implementations the two-wheeled vehicle footpeg elevational system further includes a first spring force mechanism coupled to the first footpeg and couplable to the two-wheeled vehicle, and a second spring force mechanism coupled to the second footpeg and couplable to the two-wheeled vehicle, wherein when the first footpeg is pivotally coupled with the two-wheeled vehicle, when the second footpeg is pivotally coupled with the two-wheeled vehicle, when the first spring force mechanism is coupled with the two-wheeled vehicle, and when the second spring force mechanism is coupled with the two-wheeled vehicle then when a first force is being imparted on the first footpeg then the first spring force mechanism imparts a first counter force opposing the first force and when a second force is being imparted on the second footpeg then the second spring force mechanism imparts a second counter force opposing the second force.

In one or more aspects two-wheeled vehicle footpeg elevational system for a two-wheeled vehicle including a seat with a reference point includes (I) a first footpeg pivotally couplable to the two-wheeled vehicle, the first footpeg including a distal end; and (II) a second footpeg pivotally couplable to the two-wheeled vehicle, the second footpeg including a distal end, wherein the first footpeg is coupled with the second footpeg such that when the first footpeg and second footpeg are pivotally coupled to the two-wheel vehicle, and when a first force is being imparted on the first footpeg, and a second force is being imparted on the second footpeg then the first force opposes the second force upon the second footpeg and the second force opposes the first force upon the first footpeg.

In implementations the two-wheeled vehicle footpeg elevational system further includes a cable having a first end and a second end, wherein when the first footpeg is pivotally coupled with the two-wheeled vehicle, the first footpeg is coupled with first end of the cable, and wherein when the second footpeg is pivotally coupled with the two-wheeled vehicle, the second footpeg is coupled with the second end of the cable.

In implementations the two-wheeled vehicle footpeg elevational system further includes at least one pulley member couplable with the two-wheeled vehicle, wherein when the first footpeg is pivotally coupled with the two-wheeled vehicle, when the second footpeg is pivotally coupled with the two-wheeled vehicle, and when the at least one pulley member is coupled with the two-wheeled vehicle, the cable is movably coupled with the at least one pulley member.

A two-wheeled vehicle footpeg elevational system for a two-wheeled vehicle including a seat with a reference point includes (I) a first footpeg pivotally couplable to the two-wheeled vehicle, the first footpeg including a distal end; and (II) a second footpeg pivotally couplable to the two-wheeled vehicle, the second footpeg including a distal end, wherein the first footpeg is coupled with the second footpeg such that when the first footpeg and second footpeg are pivotally coupled to the two-wheel vehicle, when no force is being imparted upon the first footpeg, and when no force is being imparted upon the second footpeg, then the first footpeg and the second footpeg are equidistant from the reference point of the seat of the two-wheeled vehicle, and wherein the first footpeg is coupled with the second footpeg such that when the first footpeg and second footpeg are pivotally coupled to the two-wheel vehicle, when a first force is being imparted on the first footpeg, and a second force is being imparted on the second footpeg then the distal end of the first footpeg is closer to the reference point of the seat of the two-wheeled vehicle than the distal end of the second footpeg is to the reference point of the seat of the two-wheeled vehicle when the second force is greater than the first force by at least a threshold amount based at least in part by a resistance force imparted by one or more of the following: at least one friction force and at least one spring mechanism force.

In implementations the two-wheeled vehicle footpeg elevational system further includes a first arm assembly pivotally couplable with the two-wheeled vehicle, and a second arm assembly pivotally couplable with the two-wheeled vehicle, wherein when the first arm assembly is pivotally couplable with the two-wheeled vehicle, the first footpeg is pivotally coupled to the two-wheel vehicle the being coupled to the first arm assembly, and wherein when the second arm assembly is pivotally couplable with the two-wheeled vehicle, the second footpeg is pivotally coupled to the two-wheel vehicle by being coupled to the second arm assembly.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

With reference now to the figures, shown are one or more examples of Foot Peg Elevational System for Self-propelled Two-Wheeled Vehicles, articles of manufacture, compositions of matter for same that may provide context, for instance, in introducing one or more processes and/or devices described herein.

DETAILED DESCRIPTION

Figure 1:
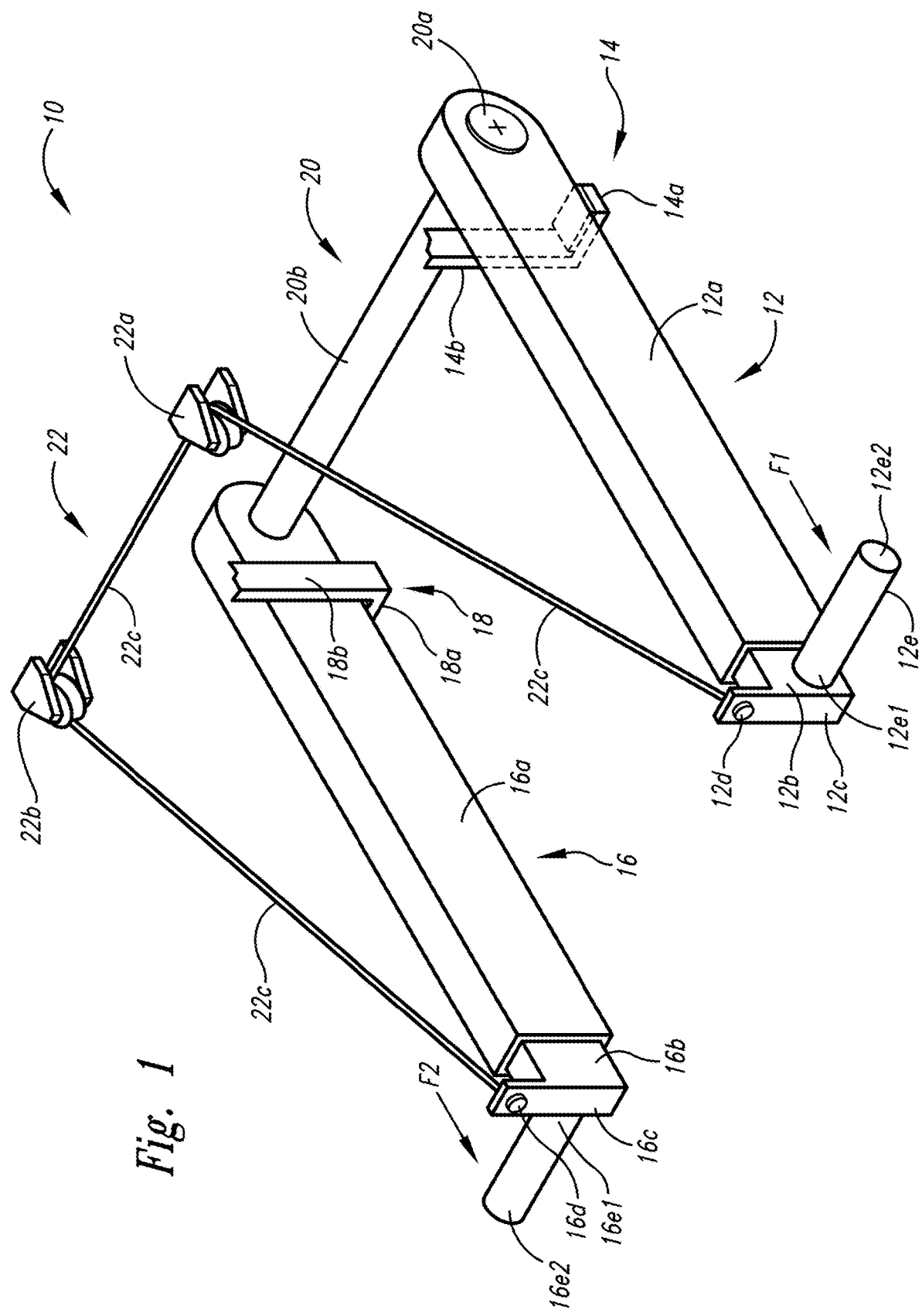
FIG. 1 is a rear perspective of a first foot peg elevational system.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Turning to FIG. 1, depicted therein is a rear perspective view of first footpeg elevational system 10. Depicted implementation of first footpeg elevational system 10 is shown to include arm assembly 12, bracket support 14, arm assembly 16, bracket support 18, rotational assembly 20, and cable assembly 22.

Depicted implementation of arm assembly 12 (e.g. box assembly) is shown to include outer arm member 12a, inner arm member 12b, end member 12c, joint 12d, and footpeg 12e with proximal end 12e1, and distal end 12e2. In implementations footpeg 12e is configured to receive forces including those in force direction F1. Depicted implementation of bracket support 14 is shown to include rest portion 14a and coupling portion 14b.

Depicted implementation of arm assembly 16 is shown to include outer arm member 16a, and inner arm member 16b, end member 16c, joint 16d, and footpeg 16e with proximal end 16e1 and distal end 16e2. In implementations footpeg 16e is configured to receive forces including those in force direction F2.

Depicted implementation of bracket support 18 is shown to include rest portion 18a and coupling portion 18b. Depicted implementation of rotational assembly 20 is shown to include coupler bearing 20a, cross member 20b, and coupler bearing 20c. Depicted implementation of cable assembly 22 is shown to include pulley member 22a, pulley member 22b, and cable member 22c being coupled with pulley member 22a, and pulley member 22b.

Figure 2:
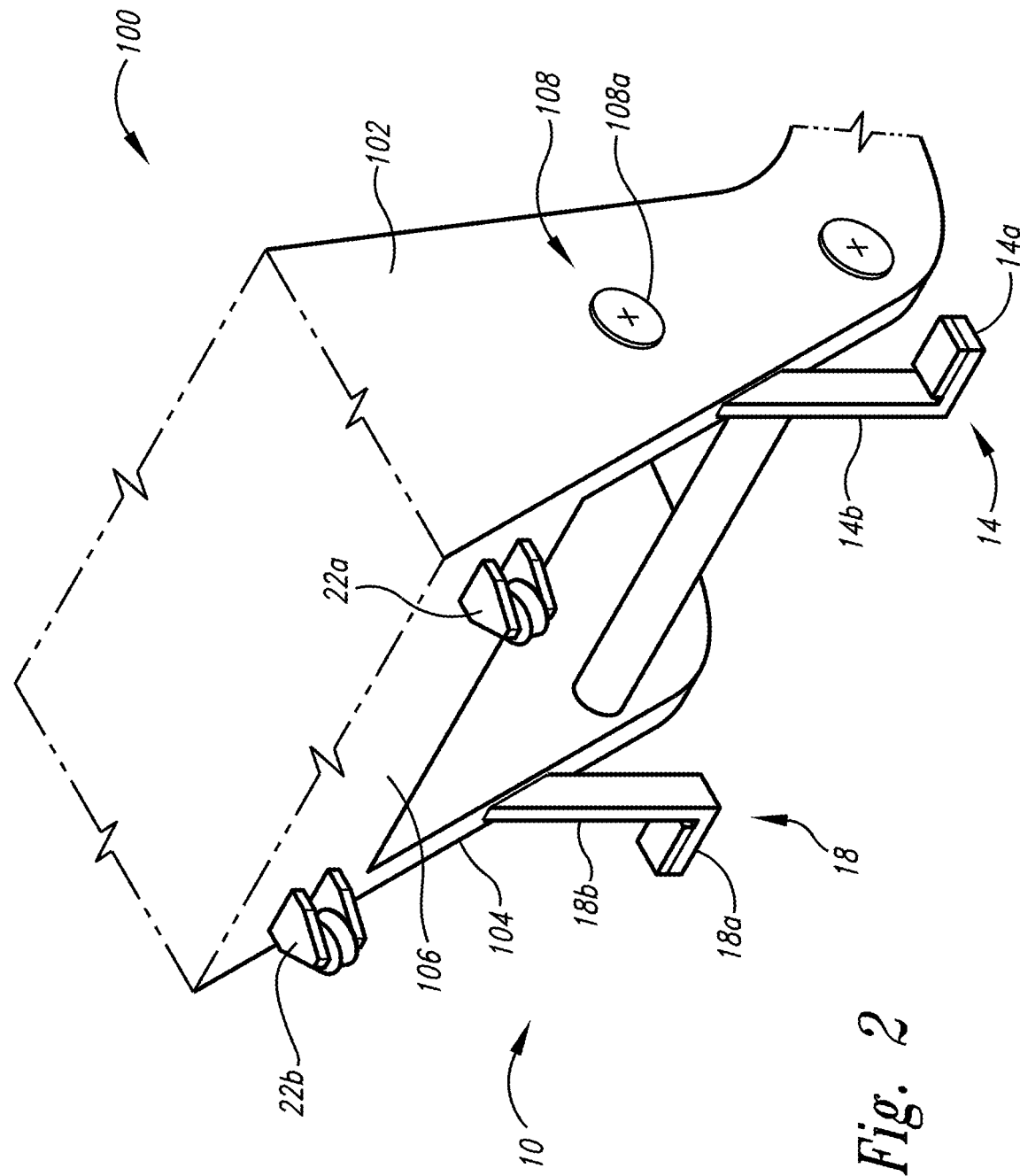
FIG. 2 is a partial rear perspective view of the first foot peg elevational system coupled with a partial rear perspective view of a self-propelled two-wheeled vehicle.

Turning to FIG. 2, depicted therein is a partial rear perspective view of first footpeg elevational system 10 coupled with a partial rear perspective view of self-propelled two-wheeled vehicle 100 (such as a internal-combustion-engine-based motorcycle as depicted or other such as electric-motor-based bikes, etc.). Depicted implementation of first footpeg elevational system 10 is shown to include self-propelled two-wheeled vehicle 100, side portion 102, side portion 104, back portion 106, and rotational assembly 108. Depicted implementation of rotational assembly 108 is shown to include coupler bearing 108a. As depicted, pulley member 22a and pulley member 22b are coupled with self-propelled two-wheeled vehicle 100.

Figure 3:
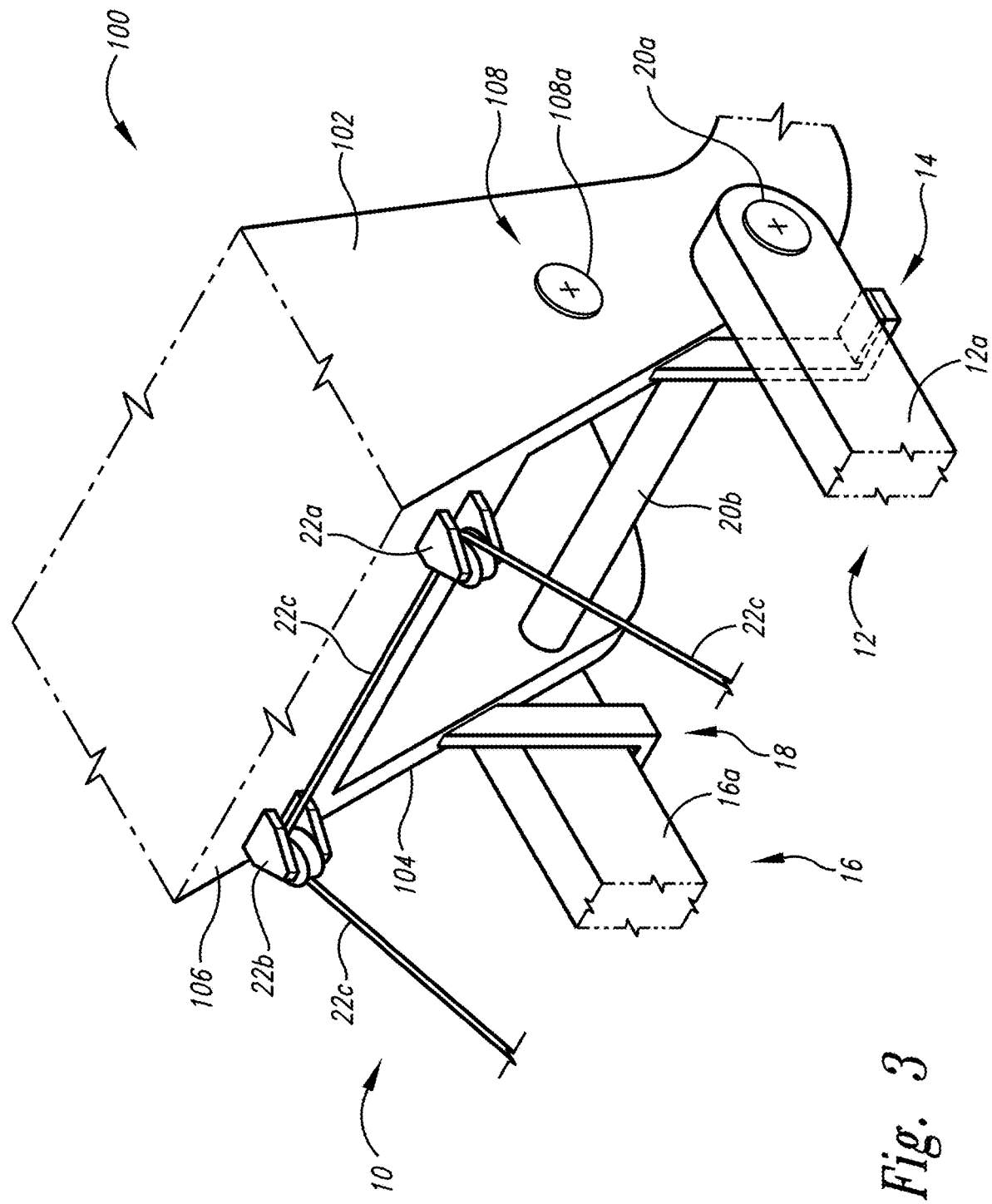
FIG. 3 is a partial rear perspective view of the first foot peg elevational system coupled with a partial rear perspective view of the self-propelled two-wheeled vehicle.

Turning to FIG. 3, depicted therein is partial rear perspective view of first footpeg elevational system 10 coupled with a partial rear perspective view of self-propelled two-wheeled vehicle 100. As depicted, arm assembly 12 and arm assembly 16 are shown to be pivotally coupled to self-propelled two-wheeled vehicle 100, so footpeg 12e and footpeg 16e are pivotally coupled to self-propelled two-wheeled vehicle 100. As depicted, outer arm member 12a of arm assembly 12 is shown resting on bracket support 14 and outer arm member 16a of arm assembly 16 is shown resting on bracket support 18, which can occur when no forces or approximately equal forces are being applied to footpeg 12e and footpeg 16e.

Figure 4:
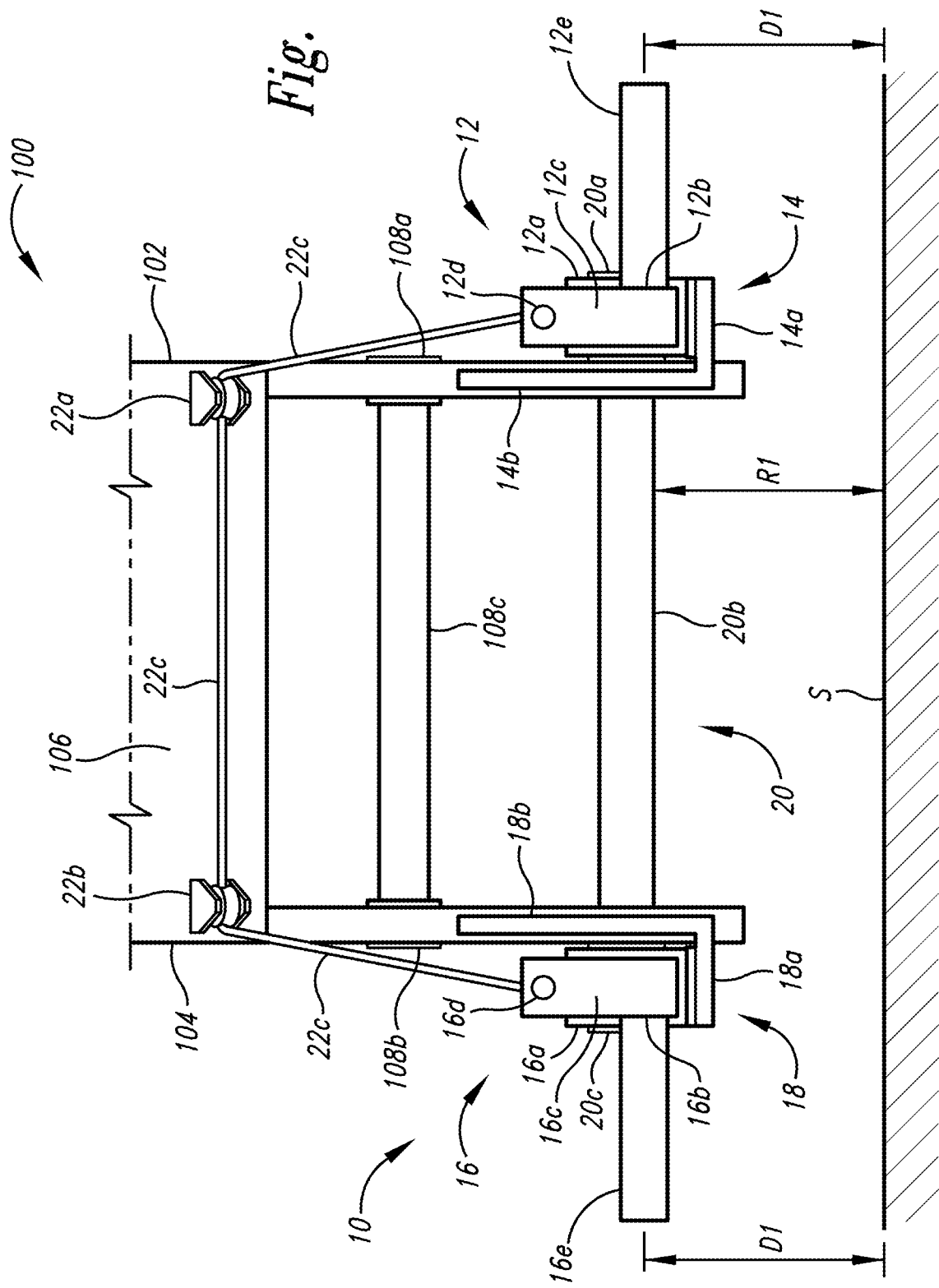
FIG. 4 is a rear elevational view of the first foot peg elevational system coupled with a partial rear elevational view of the self-propelled two-wheeled vehicle in a neutral orientation.

Turning to FIG. 4, depicted therein is a rear elevational view of first footpeg elevational system 10 coupled with a partial rear elevational view of self-propelled two-wheeled vehicle 100. Depicted implementation of rotational assembly 20 is shown to include coupler bearing 20c. Depicted implementation of rotational assembly 108 is shown to include coupler bearing 108b and cross member 108c. Depicted implementation of first footpeg elevational system 10 is shown to include distance D1 with respect to reference distance R1 and ground surface S. As depicted, distal end 12e2 of footpeg 12e and distal end 16e2 of footpeg 16e are equidistant to reference point 122a as well as being in contact with rest portion 14a of bracket support 14 and rest portion 18a of bracket support 18, respectively.

Figure 5:
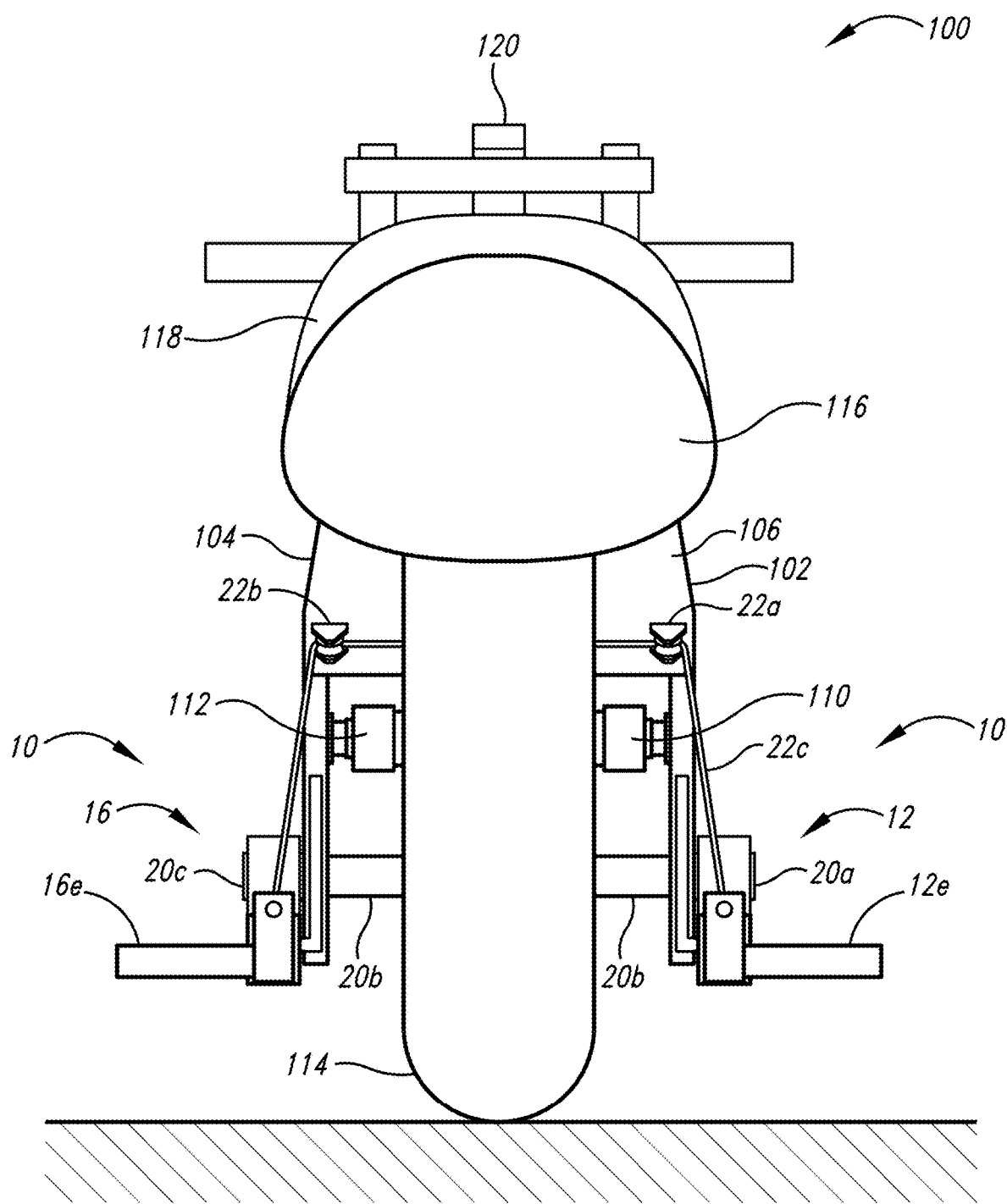
FIG. 5 is a rear elevational view of the first foot peg elevational system coupled with the self-propelled two-wheeled vehicle in a neutral orientation.

Turning to FIG. 5, depicted therein is a rear elevational view of first footpeg elevational system 10 coupled with self-propelled two-wheeled vehicle 100 in a neutral orientation. In implementations self-propelled two-wheeled vehicle 100 is shown to include suspension arm 110, suspension arm 112, tire 114, rear portion 116, mid portion 118, and front portion 120. In implementations, pivotable coupling of arm assembly 12 and arm assembly 16 with self-propelled two-wheeled vehicle 100 results in footpeg 12e and footpeg 16e being pivotably coupled with self-propelled two-wheeled vehicle 100 as well.

Figure 6:
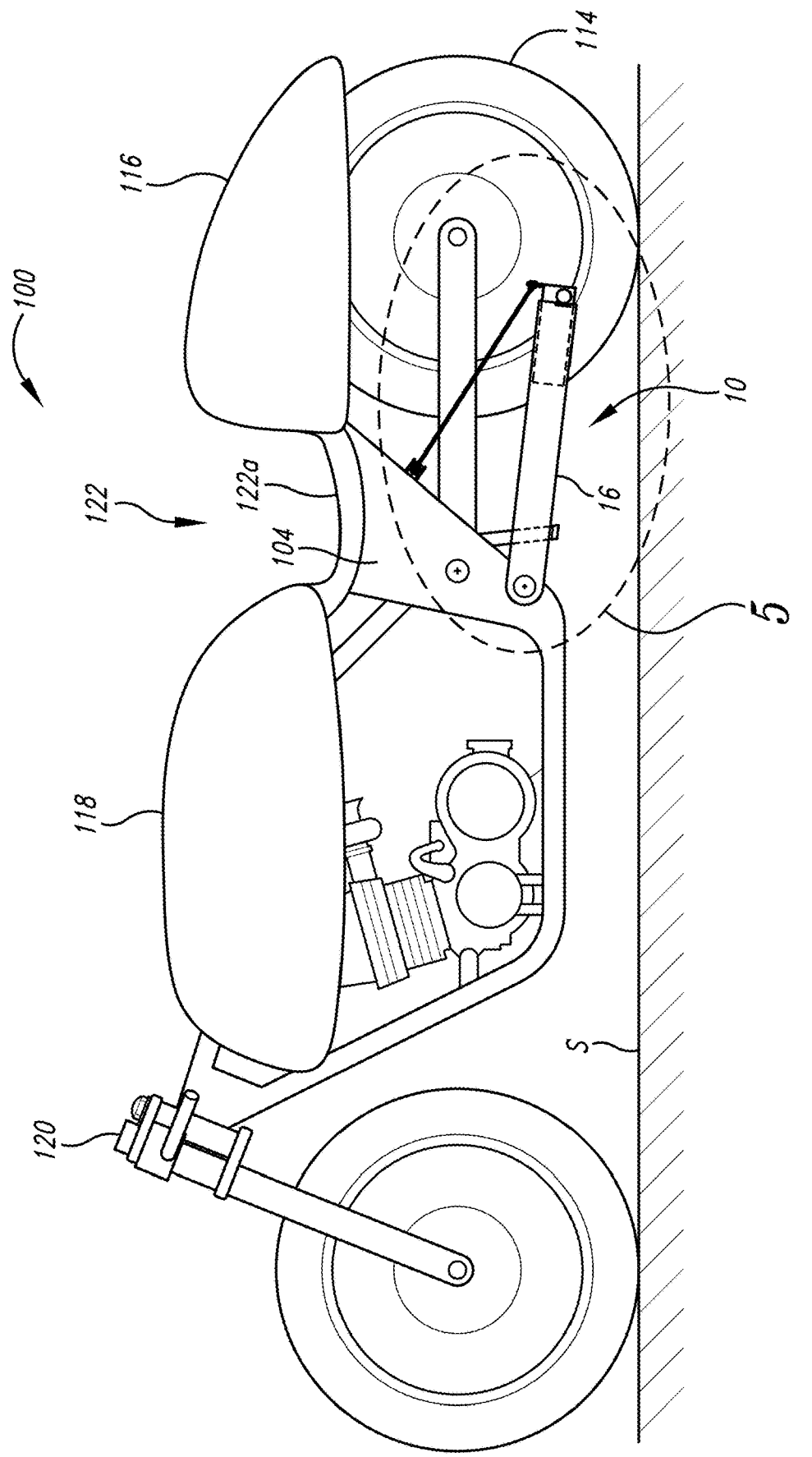
FIG. 6 is a left side elevational view of the first foot peg elevational system coupled with the self-propelled two-wheeled vehicle in a neutral orientation.

Turning to FIG. 6, depicted therein is a left side elevational view of first footpeg elevational system 10 coupled with self-propelled two-wheeled vehicle 100 in a neutral orientation. As depicted, in implementations self-propelled two-wheeled vehicle 100 includes seat 122 with reference point 122a. In implementations, when no force is being imparted upon footpeg 12e the first footpeg 12e, and no force is being imparted upon footpeg 16e, then footpeg 12e and footpeg 16e are equidistant from reference point 122a of seat 122 of self-propelled two-wheeled vehicle 100.

Figure 7:
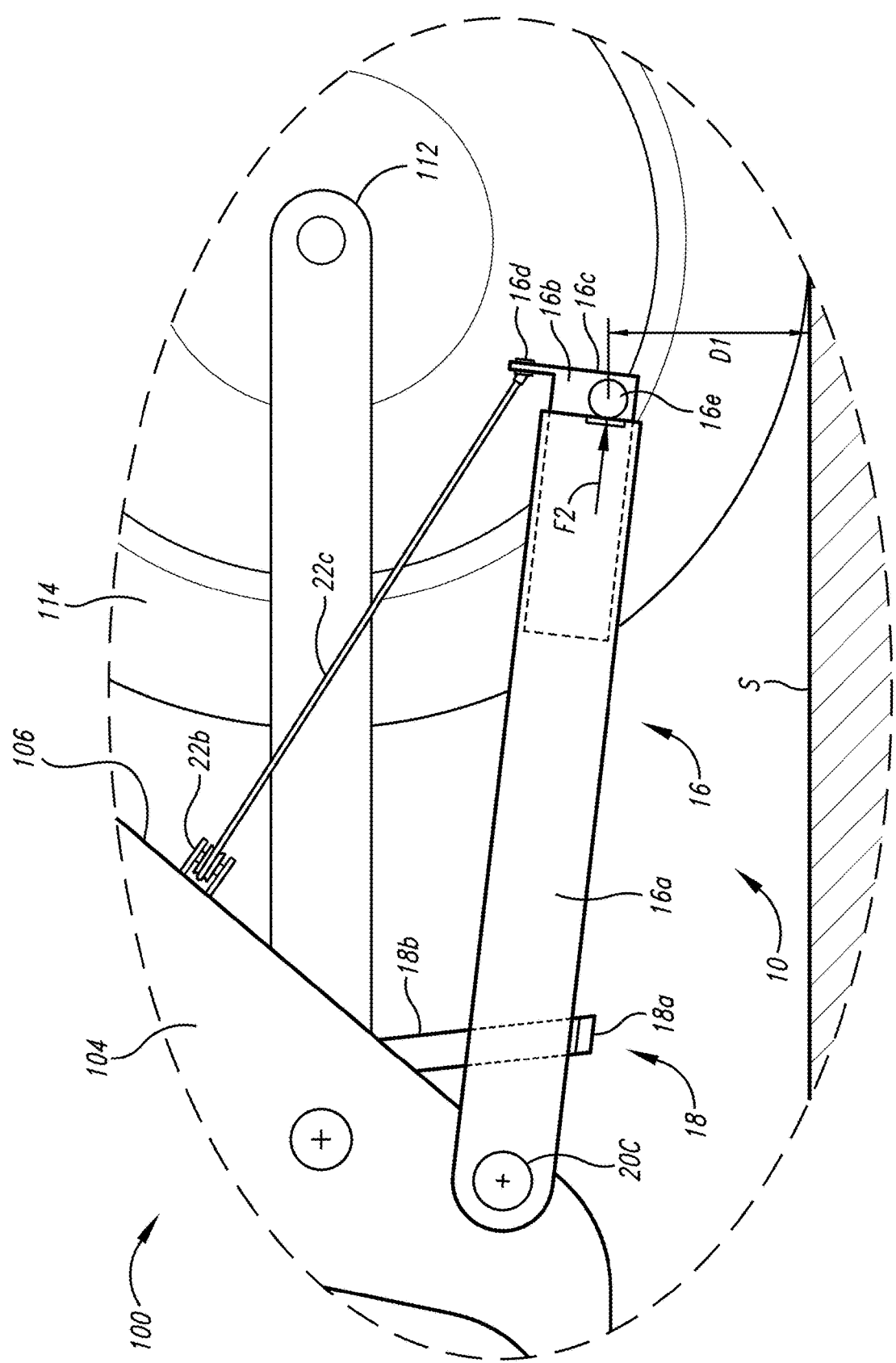
FIG. 7 is an enlarged left side elevational view of the first foot peg elevational system coupled with a partial left side elevational view of the self-propelled two-wheeled vehicle in a neutral orientation.

Turning to FIG. 7, depicted therein is an enlarged left side elevational view of first footpeg elevational system 10 coupled with a partial left side elevational view of self-propelled two-wheeled vehicle 100 in a neutral orientation. Depicted implementation of rotational assembly 20 is shown to include coupler bearing 20c.

Figure 8:
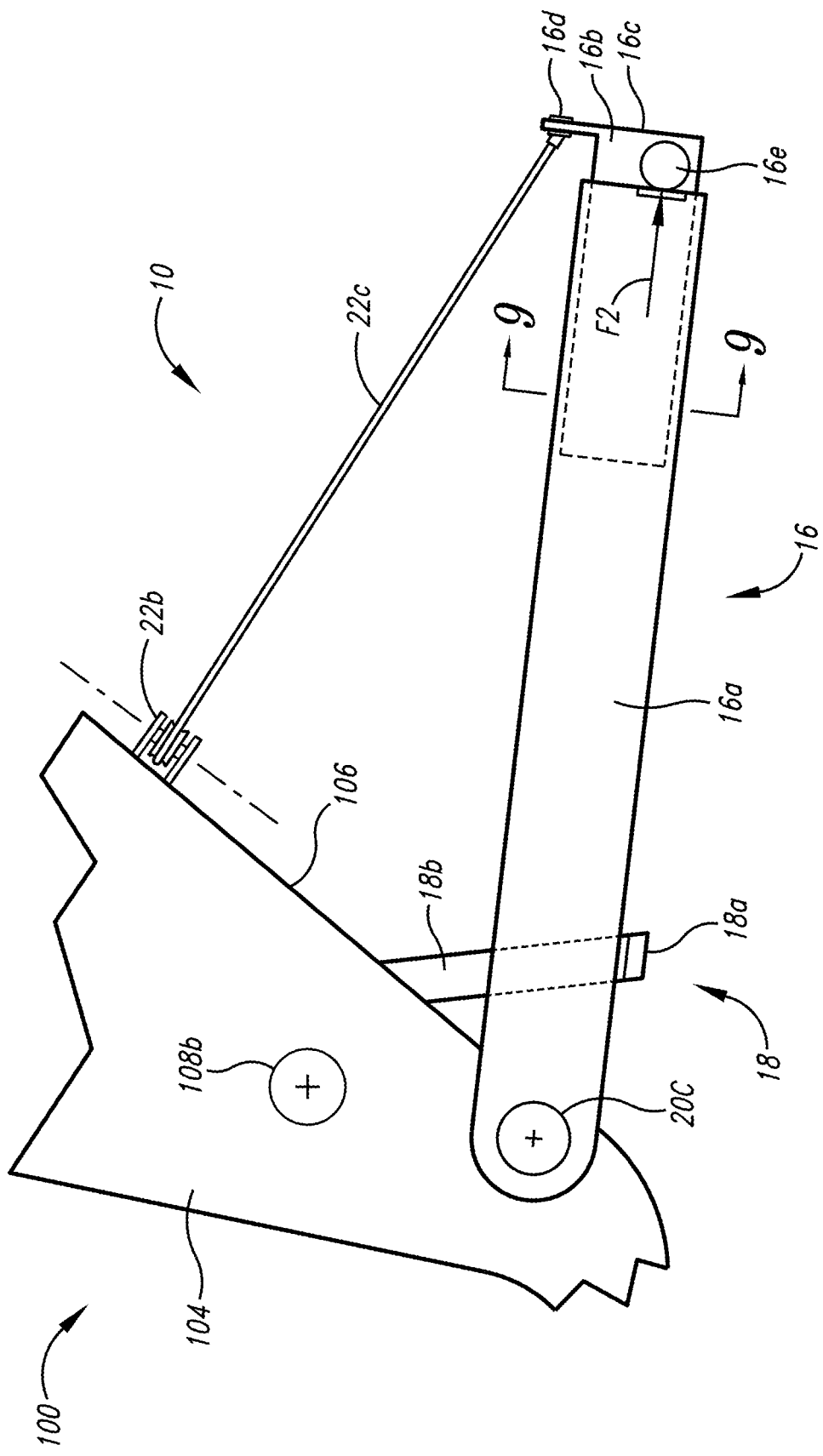
FIG. 8 is an enlarged left side elevational view of the first foot peg elevational system coupled with a partial left side elevational view of the self-propelled two-wheeled vehicle in a neutral orientation.

Turning to FIG. 8, depicted therein is an enlarged left side elevational view of first footpeg elevational system 10 coupled with a partial left side elevational view of self-propelled two-wheeled vehicle 100 in a neutral orientation.

Figure 9:
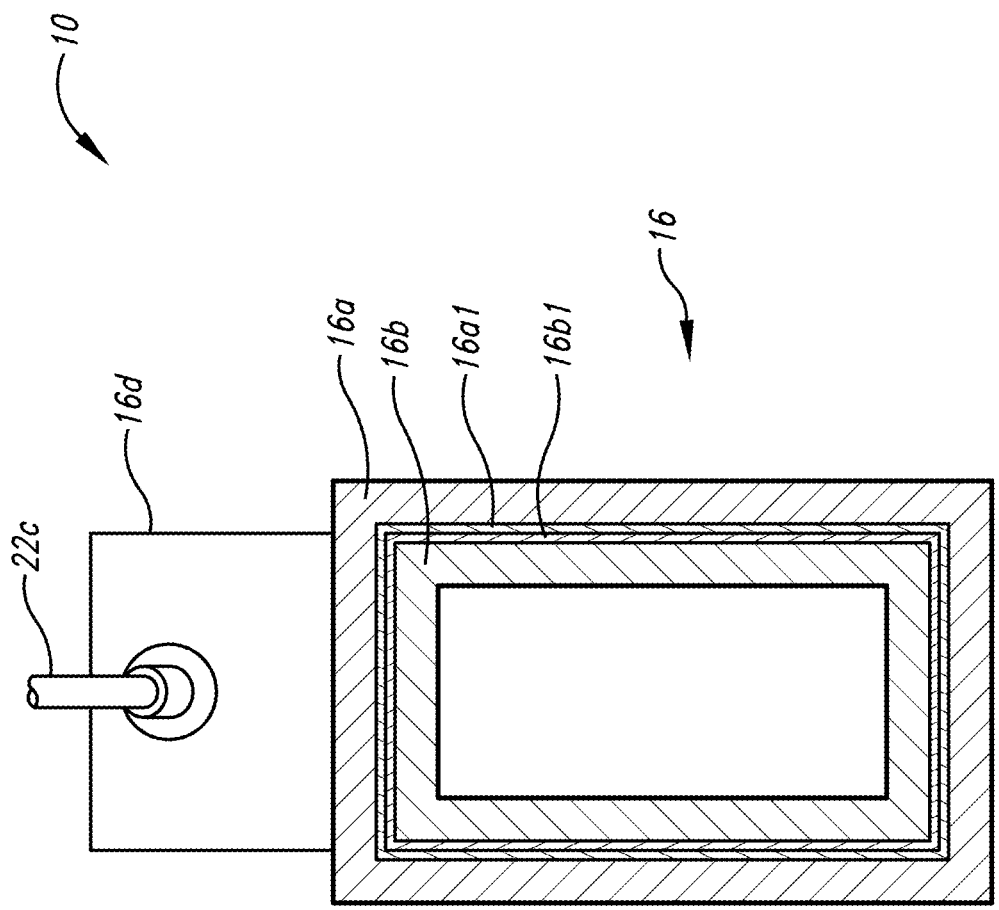
FIG. 9 is a cross sectional partial view of the first foot peg elevational system taken along the 9-9 cutline of FIG. 8.

Turning to FIG. 9, depicted therein is a cross sectional partial view of first footpeg elevational system 10 taken along the 9-9 cutline of FIG. 8. In implementations outer arm member 16a is shown to include lubricant layer 16al (such as solid Teflon, etc. or liquid petroleum or liquid synthetic based) and inner arm member 16*b* is shown to include lubricant layer 16*b*1 (such as solid Teflon, etc. or liquid petroleum or liquid synthetic based) resulting in outer arm member 16*a* and inner arm member 16*b* of arm assembly 16 being slidably coupled together. Similar lubrication can be used with outer arm member 12*a* and inner arm member 12*b* of arm assembly 12.

In implementations, when force in force direction F1 is being imparted on footpeg 12*e* and force in force direction F2 is being imparted on footpeg 16*e* then the distal end 12*e*2 of footpeg 12*e* is closer to reference point 122*a* of seat 122 of self-propelled two-wheeled vehicle 100 than distal end 16*e*2 of footpeg 16*e* is to reference point 122*a* when force in force direction F2 is greater than force in force direction F1 which in some implementations can include a threshold amount based at least in part on at least one material friction coefficient such a involving components of arm assembly 12 and arm assembly 16 or involving rotatable coupling of arm assembly 12 and arm assembly 16 with self-propelled two-wheeled vehicle 100.

Figure 10:
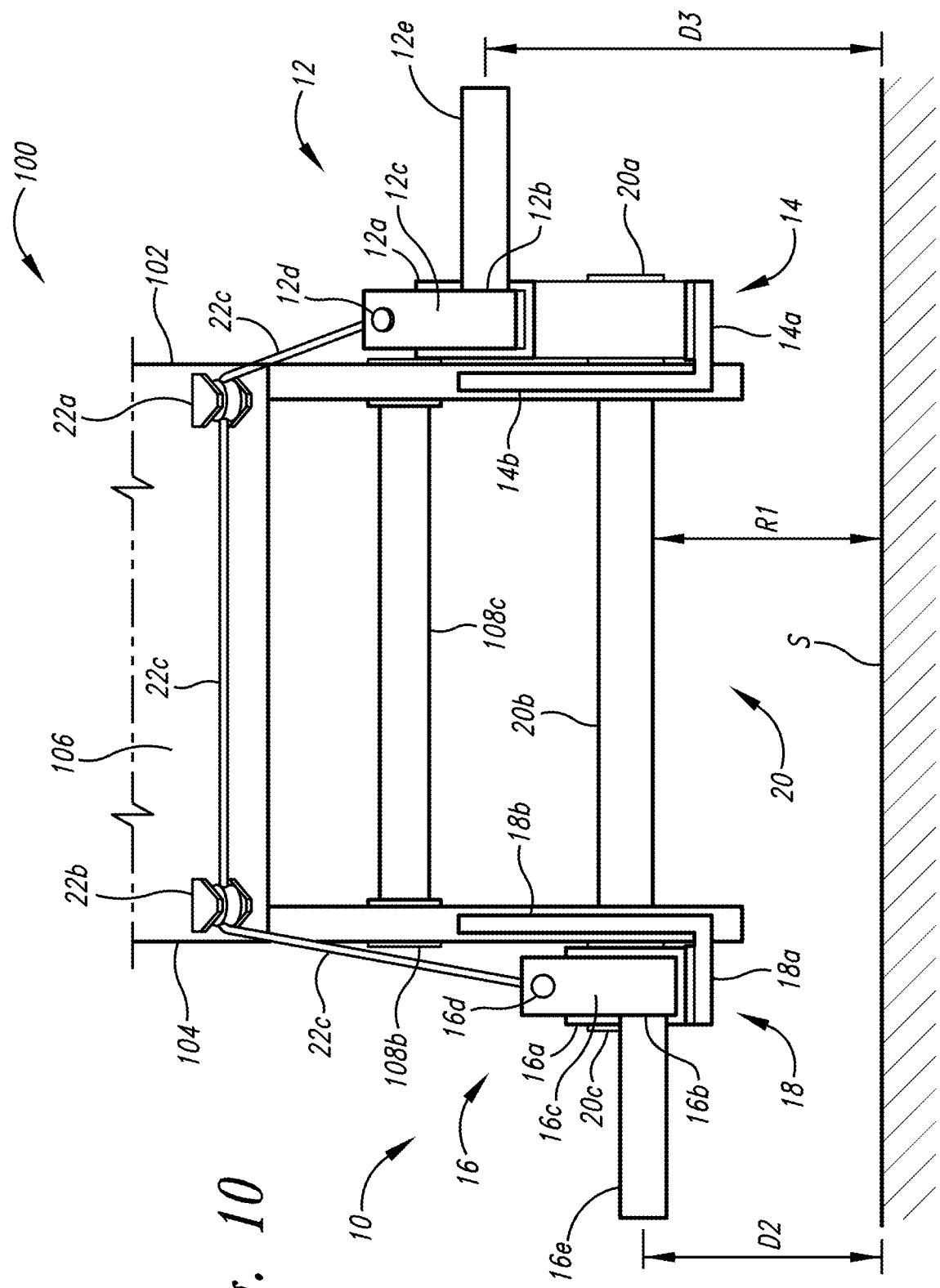
FIG. 10 is a rear elevational view of the first foot peg elevational system coupled with a partial rear elevational view of the self-propelled two-wheeled vehicle in a right-leaning orientation.

Turning to FIG. 10, depicted therein is a rear elevational view of first footpeg elevational system 10 coupled with a partial rear elevational view of the self-propelled two-wheeled vehicle 100 in a right-leaning orientation. In implementations first footpeg elevational system 10 is shown to include distance D2 and distance D3 with respect to reference distance R1 and ground surface S.

Figure 11:
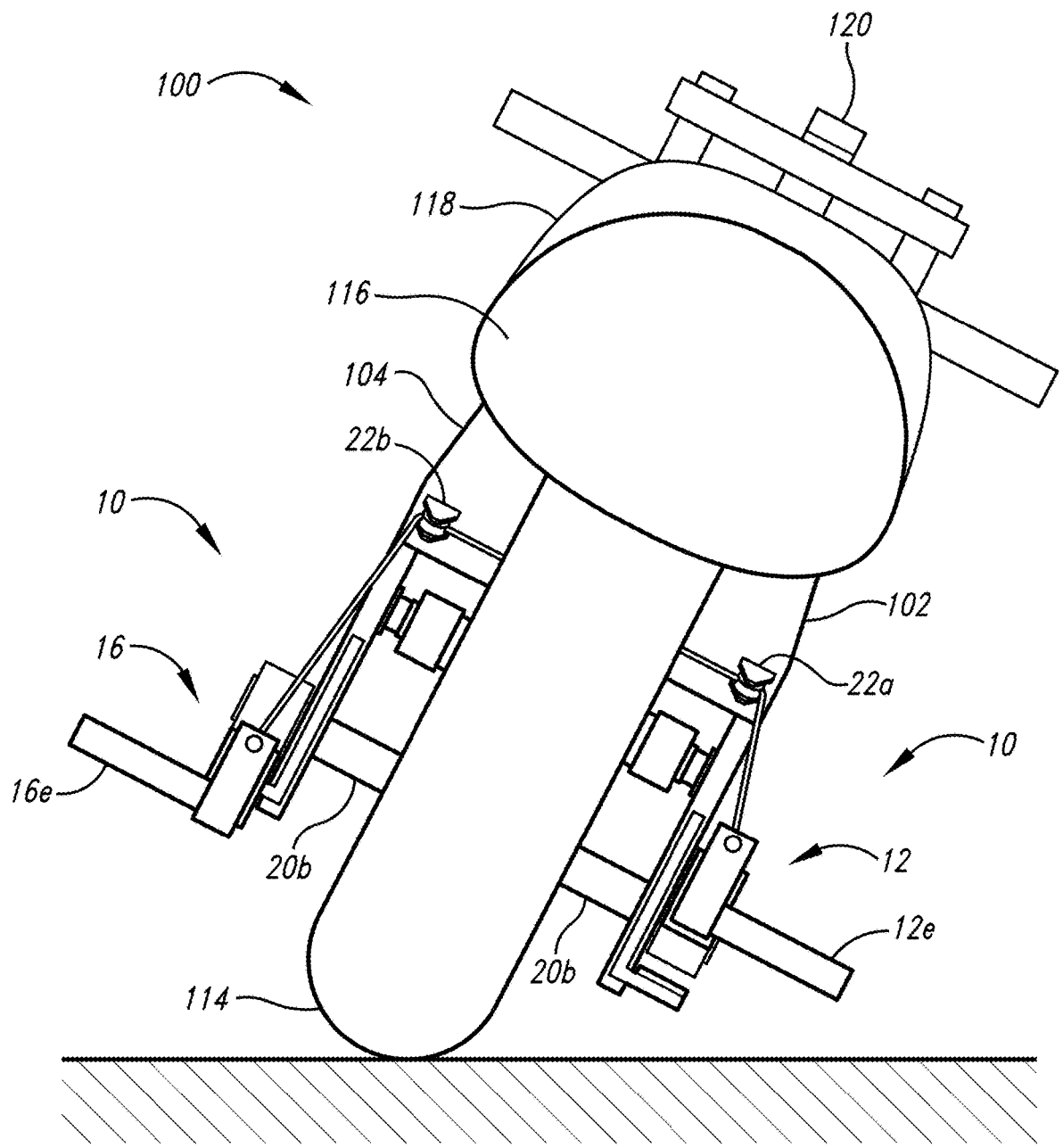
FIG. 11 is a rear elevational view of the first foot peg elevational system coupled with a partial rear elevational view of the self-propelled two-wheeled vehicle in a right-leaning orientation.

Turning to FIG. 11, depicted therein is a rear elevational view of first footpeg elevational system 10 coupled with a partial rear elevational view of self-propelled two-wheeled vehicle 100 in a right-leaning orientation. In implementations footpeg 12*e* is mechanically linked (such as with cable assembly 22) to footpeg 16*e* so that distal end 12*e*2 of footpeg 12*e* becomes closer to reference point 122*a* of seat 122 of self-propelled two-wheeled vehicle 100 when footpeg 16*e* of footpeg 16*e* becomes farther from reference point 122*a* of seat 122 of seat 122. In implementations, when force in force direction F1 on footpeg 12*e* and force in force direction F2 is being imparted on footpeg 16*e* then the distal end 12*e*2 of footpeg 12*e* is farther from reference point 122*a* of seat 122 of self-propelled two-wheeled vehicle 100 than distal end 16*e*2 of footpeg 16*e* is to reference point 122*a* of seat 122 when force in force direction F2 is less than force in force direction F1.

Figure 12:
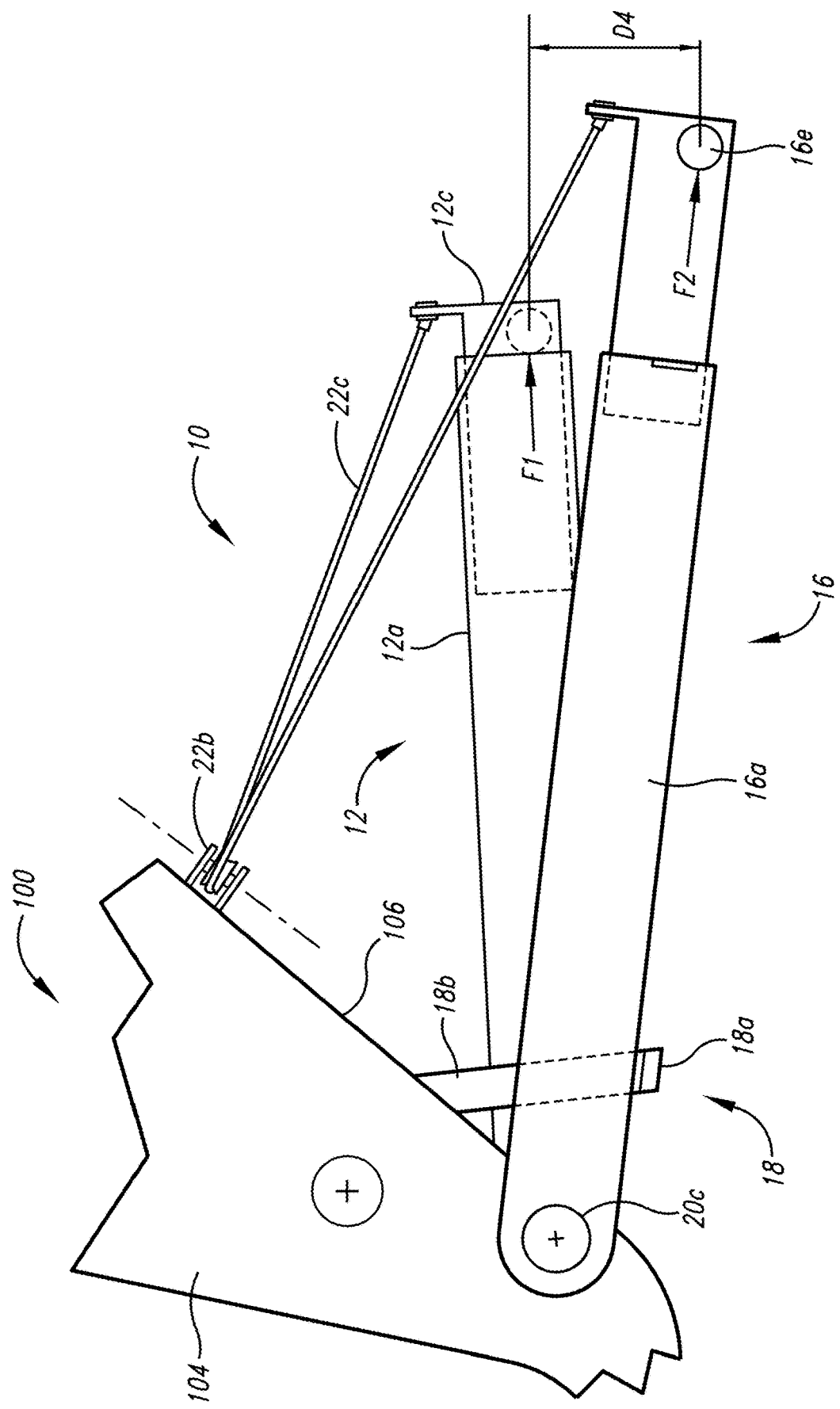
FIG. 12 is an enlarged left side elevational view of the first foot peg elevational system coupled with a partial left side elevational view of the self-propelled two-wheeled vehicle in a right-leaning orientation.

Turning to FIG. 12, depicted therein is an enlarged left side elevational view of first footpeg elevational system 10 coupled with a partial left side elevational view of self-propelled two-wheeled vehicle 100 in a right-leaning orientation resulting in distance D4. In implementations, force applied in force direction F1 onto footpeg 12*e* and force applied in force direction F2 onto footpeg 16*e* oppose each other through coupling with cable assembly 22. As depicted footpeg 12*e* is closer to reference point 122*a* than footpeg 16*e* is to reference point 122*a* as a consequence of force direction F2, which is opposing force in force direction F1, being greater than force in force direction F1.

Figure 13:
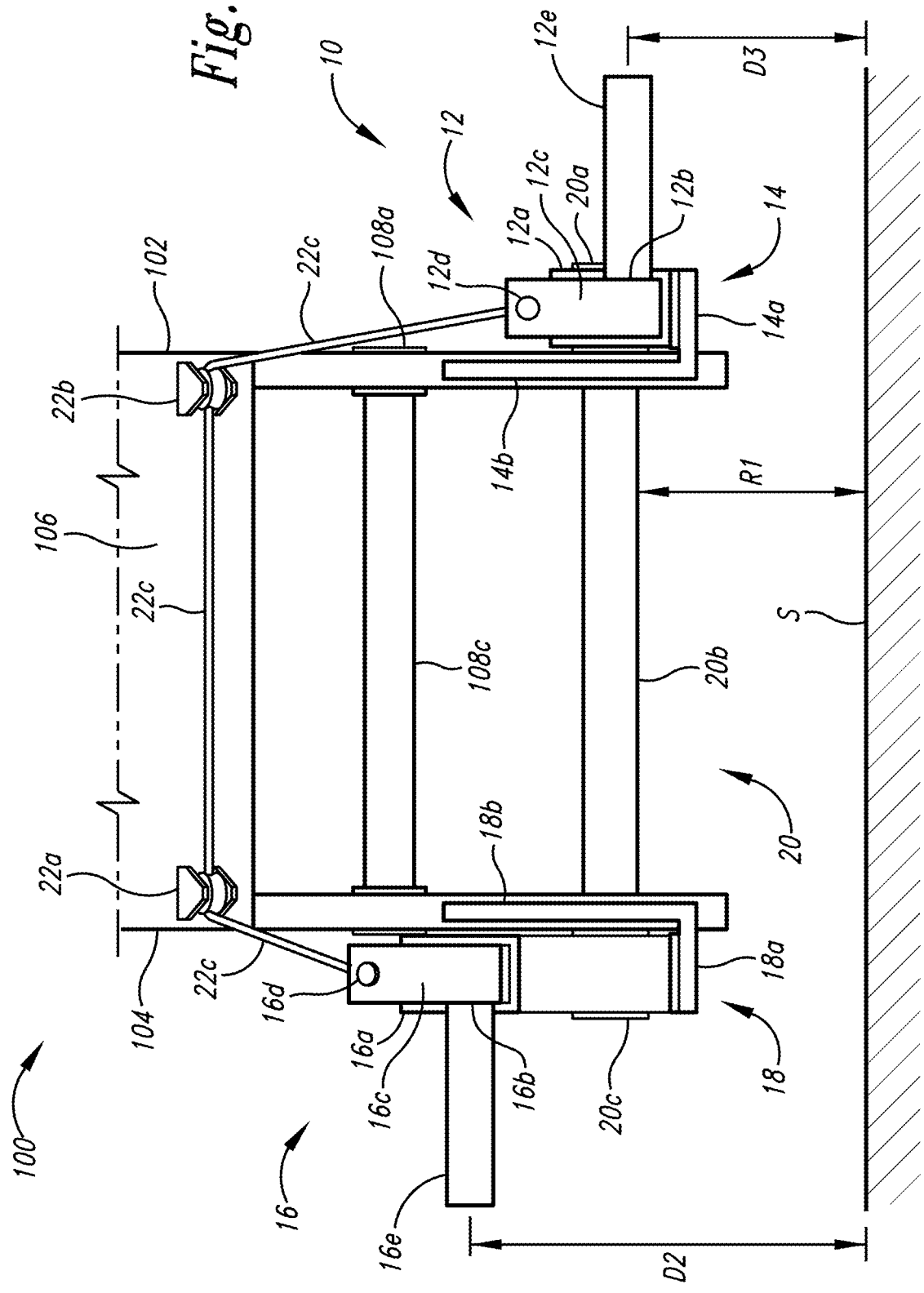
FIG. 13 is a rear elevational view of the first foot peg elevational system coupled with a partial rear elevational view of the self-propelled two-wheeled vehicle in a left-leaning orientation.

Turning to FIG. 13, depicted therein is a rear elevational view of first footpeg elevational system 10 coupled with a partial rear elevational view of the self-propelled two-wheeled vehicle 100 in a left-leaning orientation shown to include distance D2 and distance D3 with respect to reference distance R1 and ground surface S.

Figure 14:
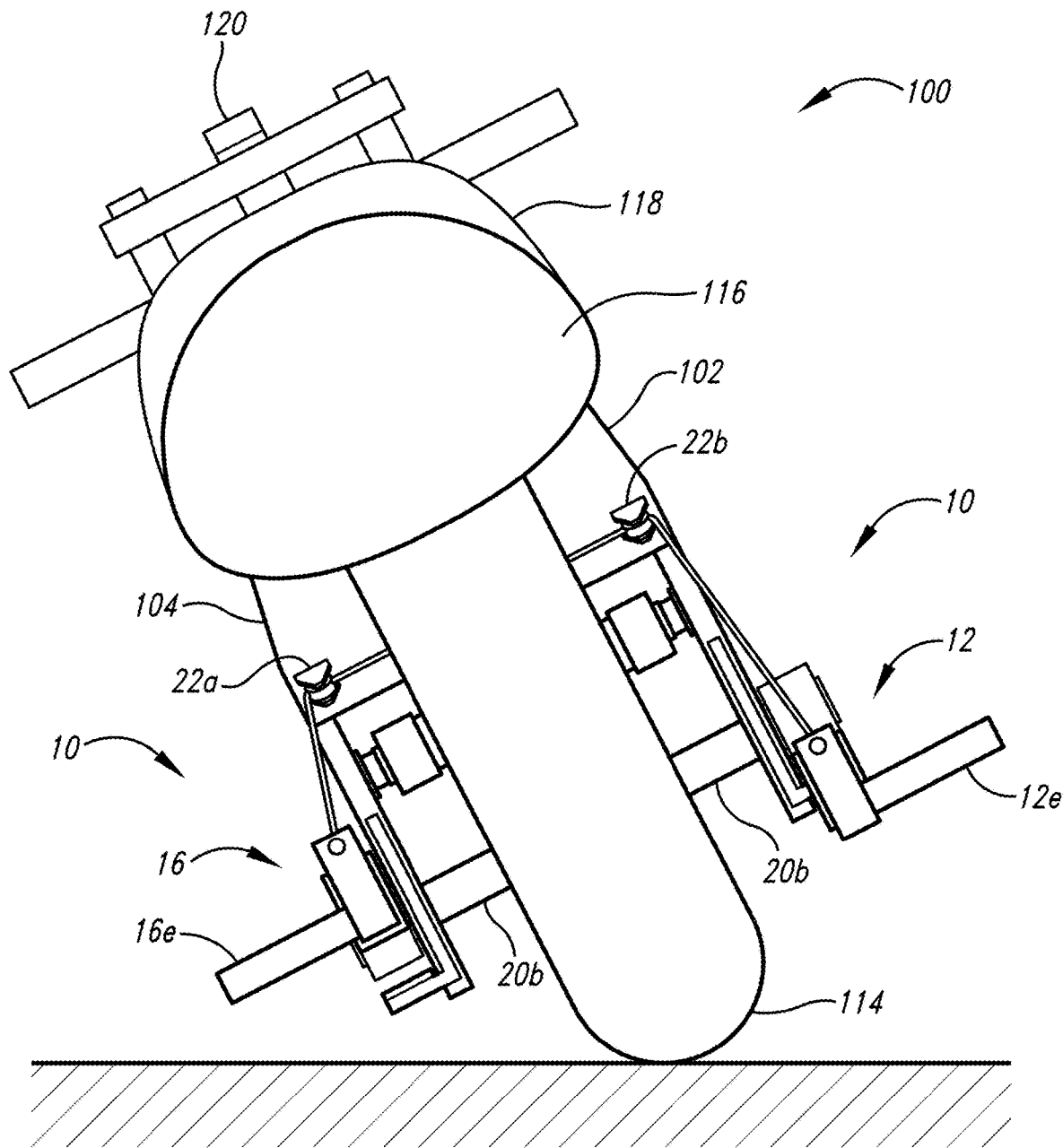
FIG. 14 is a rear elevational view of the first foot peg elevational system coupled with the self-propelled two-wheeled vehicle in a left leaning orientation.

Turning to FIG. 14, depicted therein is a rear elevational view of first footpeg elevational system 10 coupled with self-propelled two-wheeled vehicle 100 in a left-leaning orientation. In implementations, when force in force direction F1 is being imparted on footpeg 12*e* and force in force direction F2 is being imparted on footpeg 16*e*, then distal end 12*e*2 of footpeg 12*e* is closer to reference point 122*a* of seat 122 of self-propelled two-wheeled vehicle 100 than distal end 16*e*2 of footpeg 16*e* is to reference point 122*a* when force in force direction F2 is greater than force in force direction F1.

Figure 15:
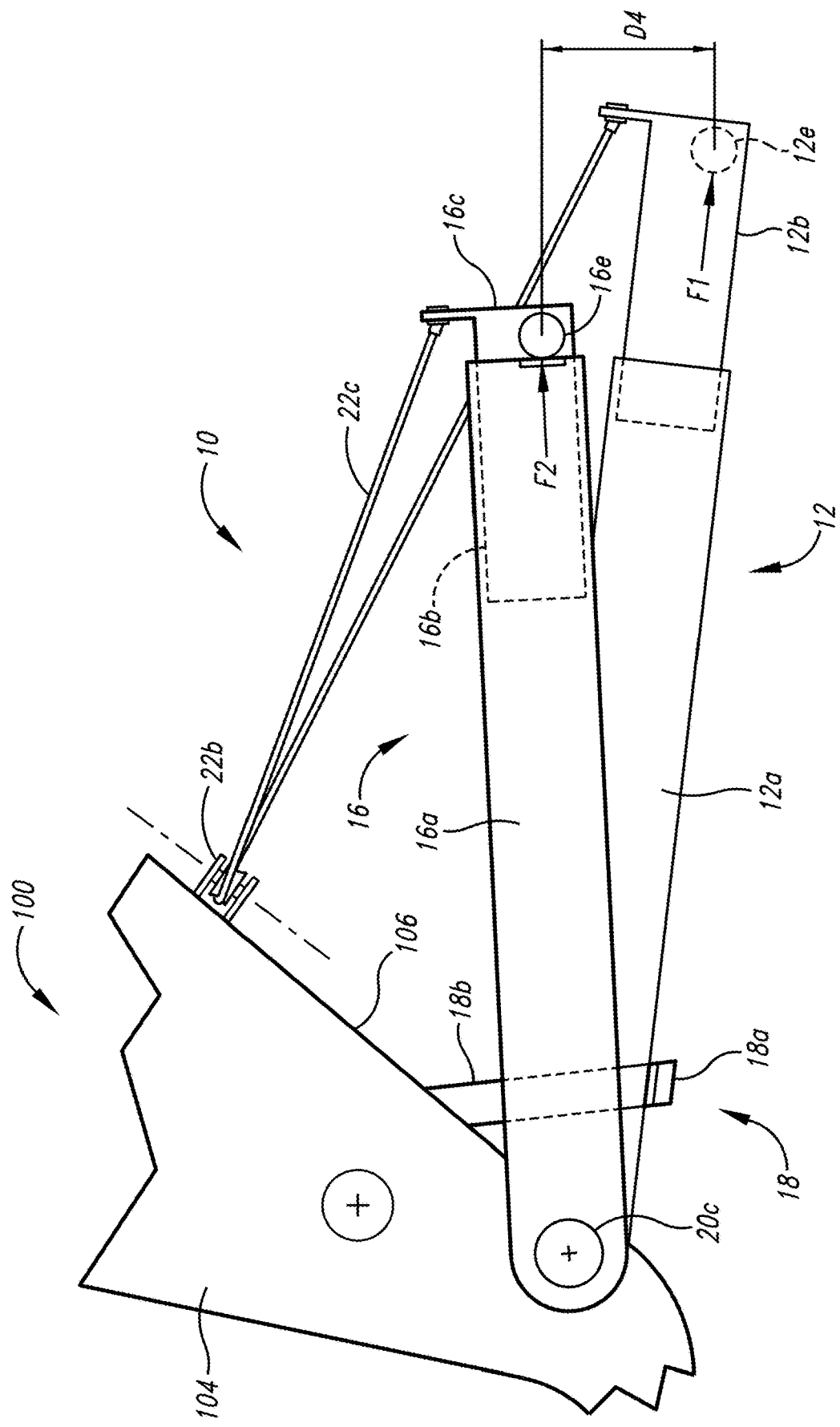
FIG. 15 is an enlarged left side elevational view of the first foot peg elevational system coupled with a partial left side elevational view of the self-propelled two-wheeled vehicle in a left-leaning orientation.

Turning to FIG. 15, depicted therein is an enlarged left side elevational view of first footpeg elevational system 10 coupled with a partial left side elevational view of self-propelled two-wheeled vehicle 100 in a left-leaning orientation resulting in distance D4.

Figure 16:
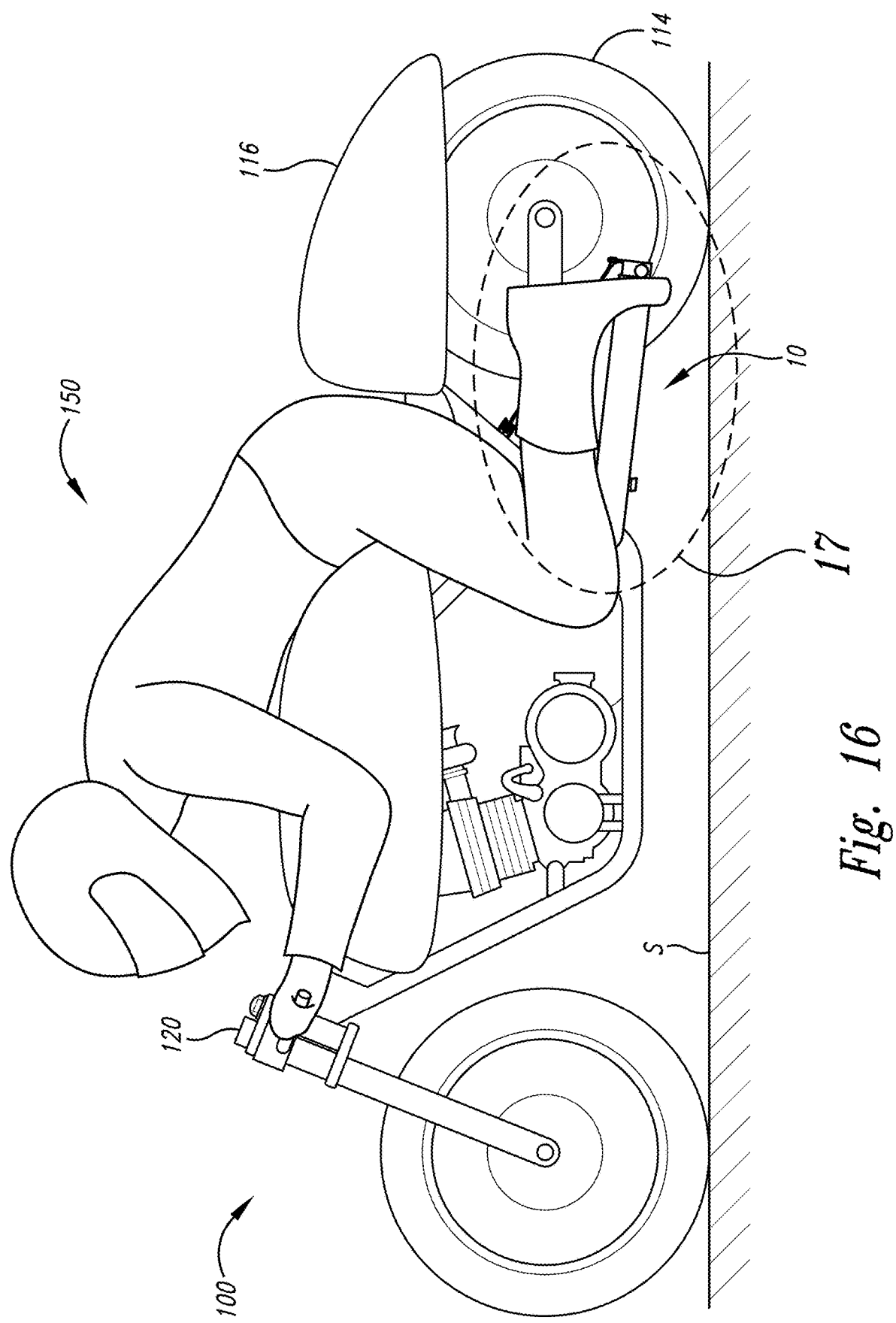
FIG. 16 is a left side elevational view of the first foot peg elevational system coupled with the self-propelled two-wheeled vehicle and rider thereon in a neutral orientation.

Turning to FIG. 16, depicted therein is a left side elevational view of first footpeg elevational system 10 coupled with self-propelled two-wheeled vehicle 100 and rider 150 thereon in a neutral orientation.

Figure 17:
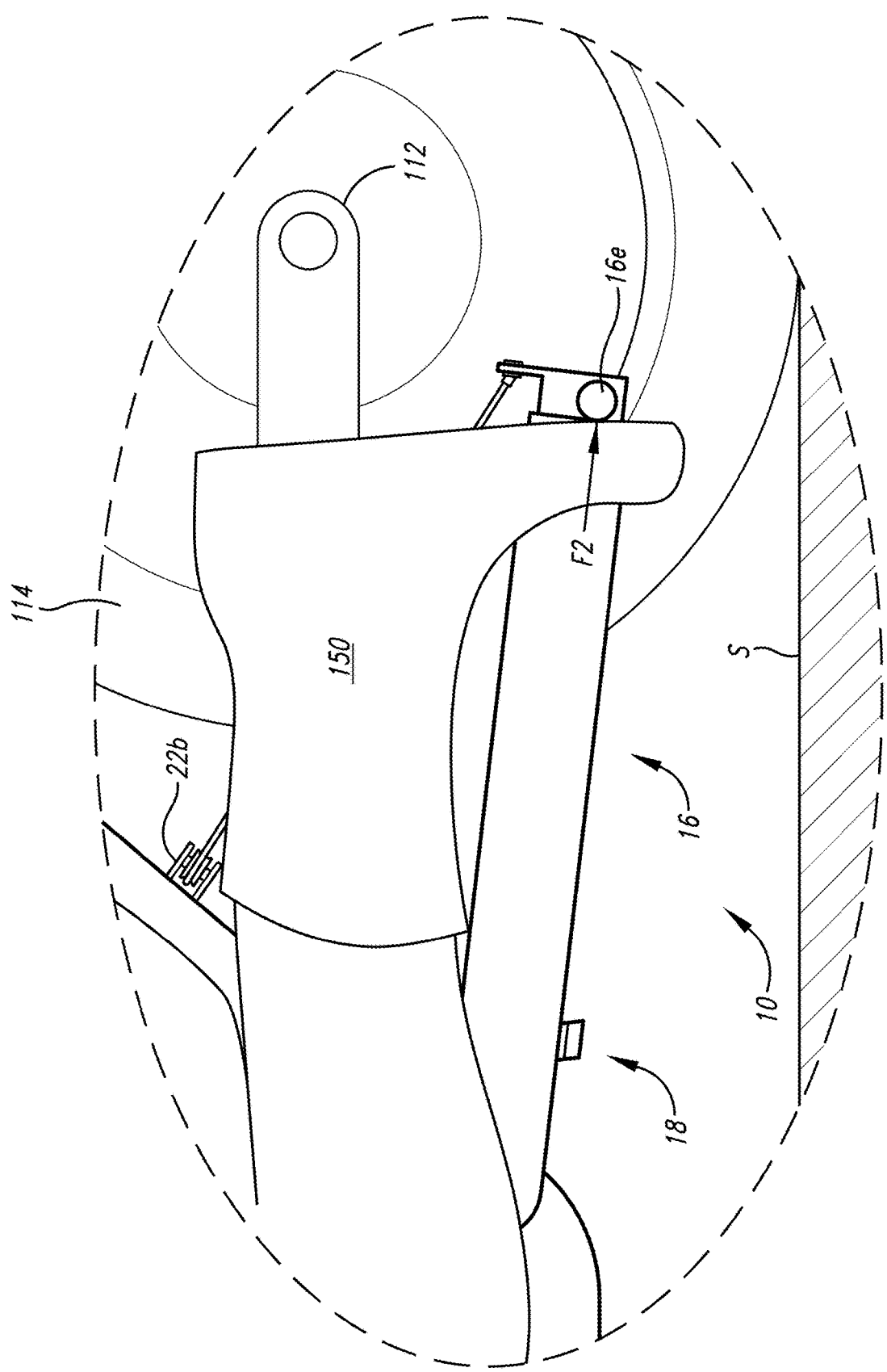
FIG. 17 is a enlarged left side elevational view of the first foot peg elevational system coupled with a partial left side elevational view of the self-propelled two-wheeled vehicle with a rider thereon in a neutral orientation.

Turning to FIG. 17, depicted therein is an enlarged left side elevational view of first footpeg elevational system 10 coupled with a partial left side elevational view of the self-propelled two-wheeled vehicle 100 and rider 150 thereon in a neutral orientation.

Figure 18:
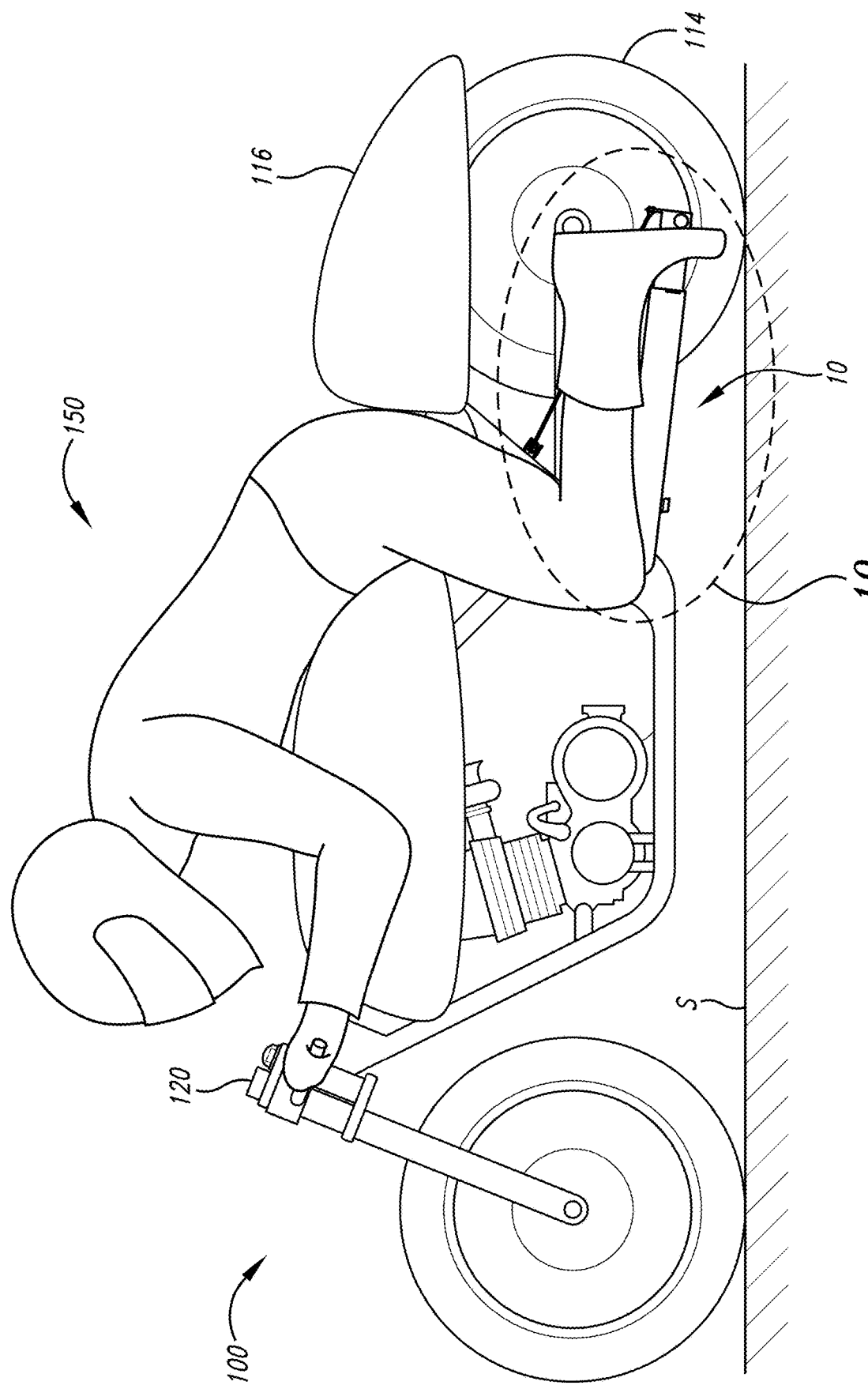
FIG. 18 is a left side elevational view of the first foot peg elevational system coupled with the self-propelled two-wheeled vehicle with a rider thereon in a right-leaning orientation.

Turning to FIG. 18, depicted therein is a left side elevational view of first footpeg elevational system 10 coupled with self-propelled two-wheeled vehicle 100 and rider 150 thereon in a right-leaning orientation.

Figure 19:
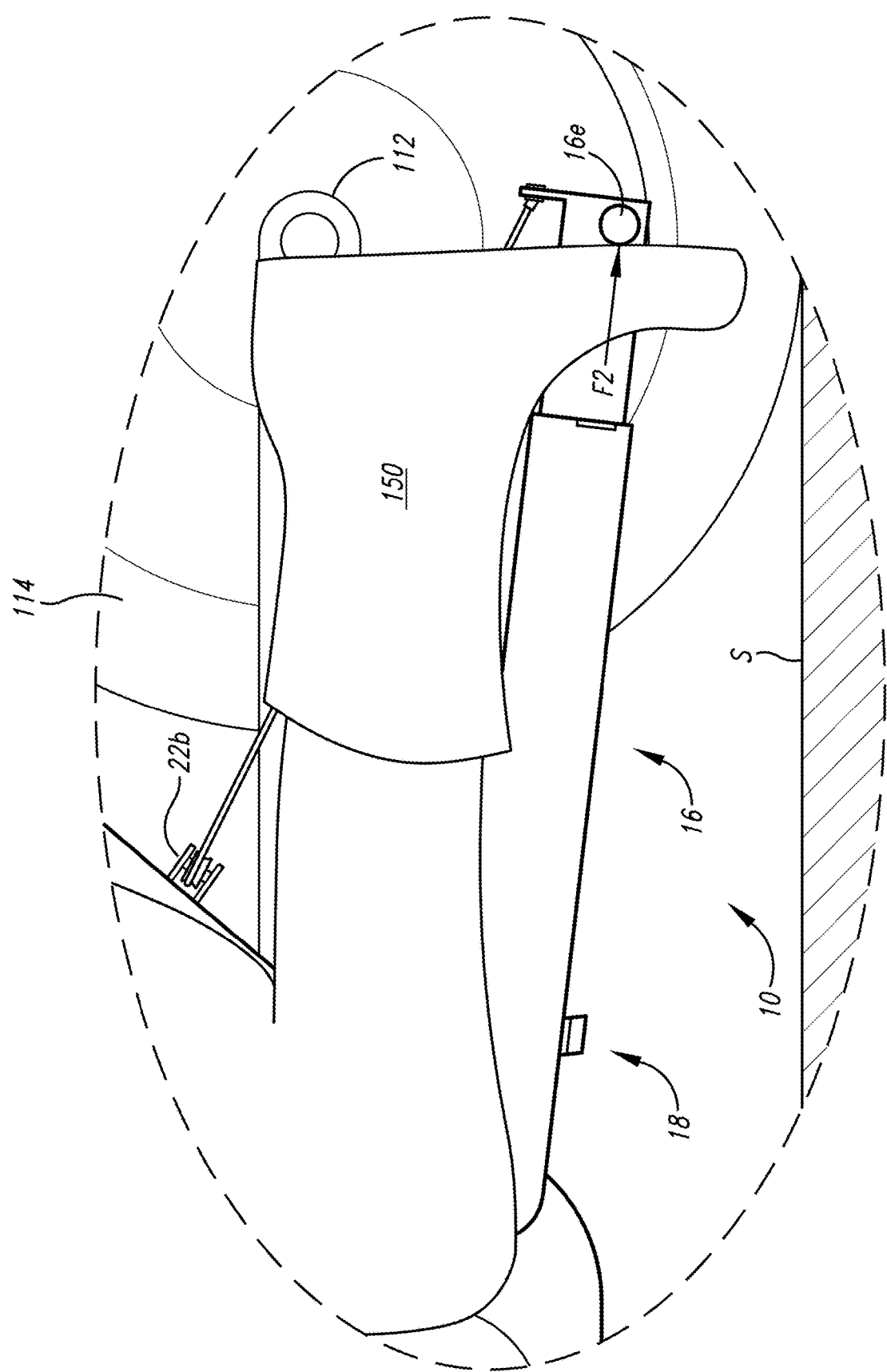
FIG. 19 is an enlarged left side elevational view of the first foot peg elevational system coupled with a partial left side elevational view of the self-propelled two-wheeled vehicle with a rider thereon in a right-leaning orientation.

Turning to FIG. 19, depicted therein is an enlarged left side elevational view of first footpeg elevational system 10 coupled with a partial left side elevational view of self-propelled two-wheeled vehicle 100 and rider 150 thereon in a right-leaning orientation.

Figure 20:
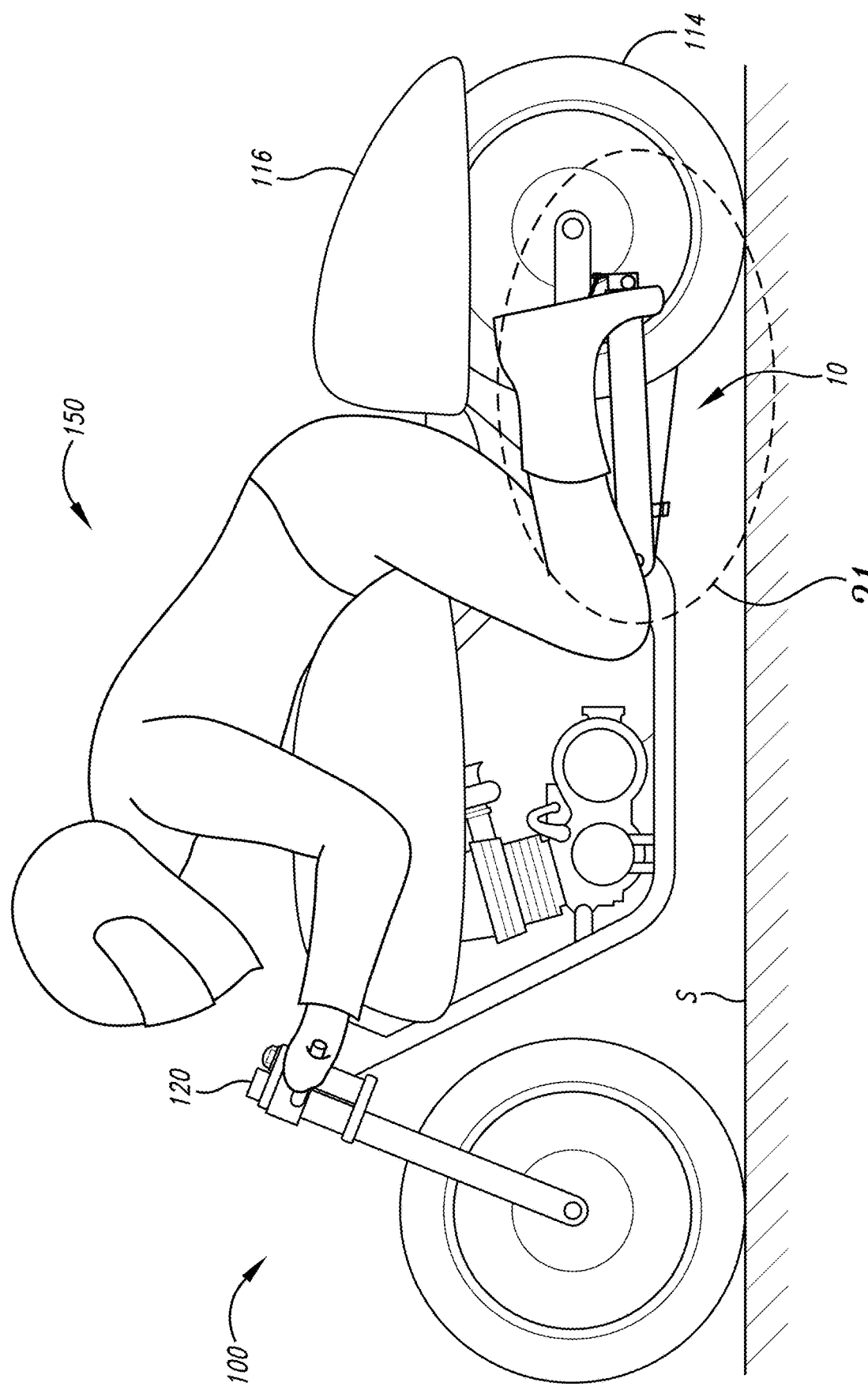
FIG. 20 is a left side elevational view of the first foot peg elevational system coupled with a left side elevational view of the self-propelled two-wheeled vehicle with a rider thereon in a left-leaning orientation.

Turning to FIG. 20, depicted therein is a left side elevational view of first footpeg elevational system 10 coupled with a left side elevational view of self-propelled two-wheeled vehicle 100 and rider 150 thereon in a left-leaning orientation.

Figure 21:
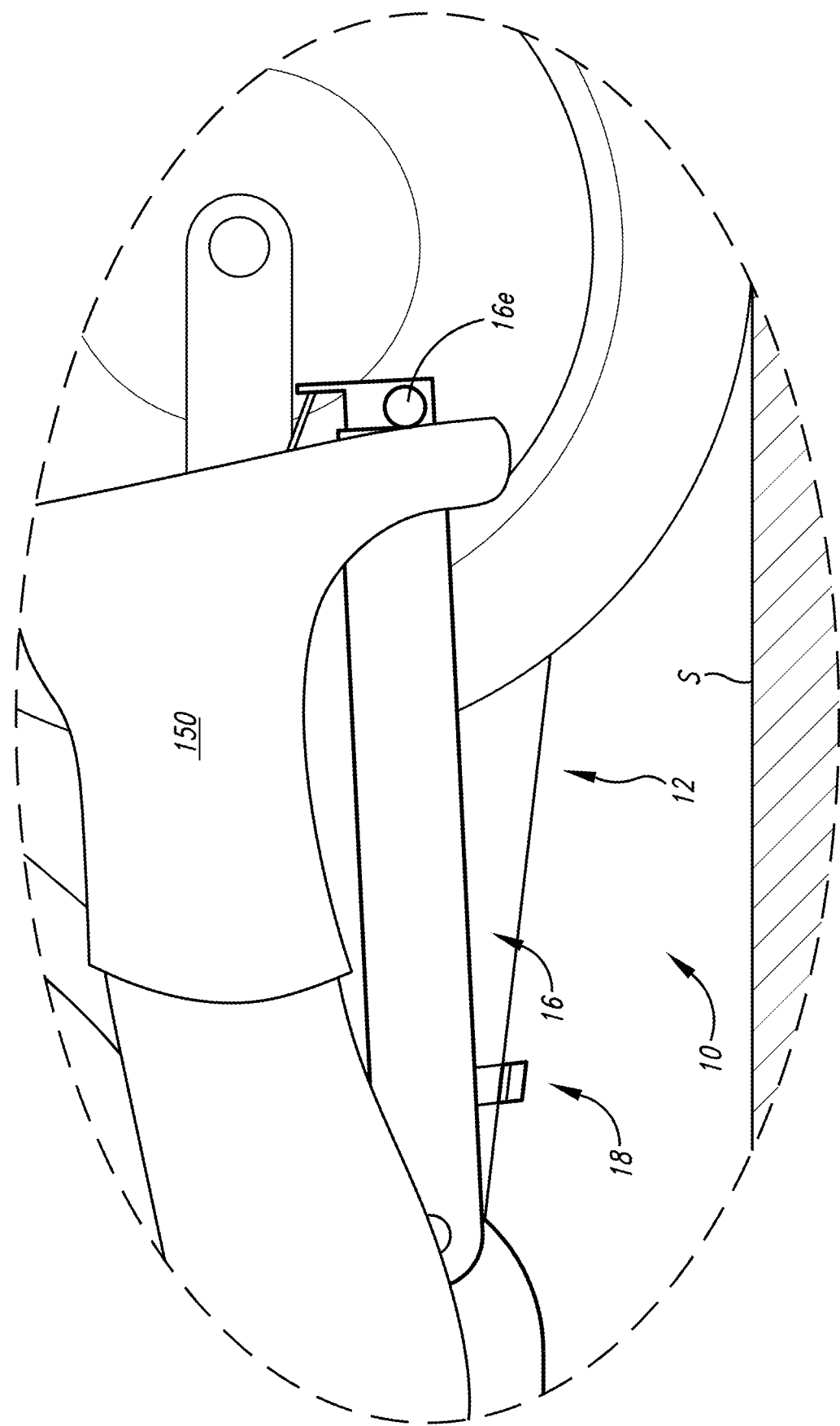
FIG. 21 is an enlarged left side elevational view of the first foot peg elevational system coupled with a partial left side elevational view of the self-propelled two-wheeled vehicle with rider thereon in a left-leaning orientation.

Turning to FIG. 21, depicted therein is an enlarged left side elevational view of first footpeg elevational system 10 coupled with a partial left side view of self-propelled two-wheeled vehicle 100 with rider 150 thereon in a left-leaning orientation.

Figure 22:
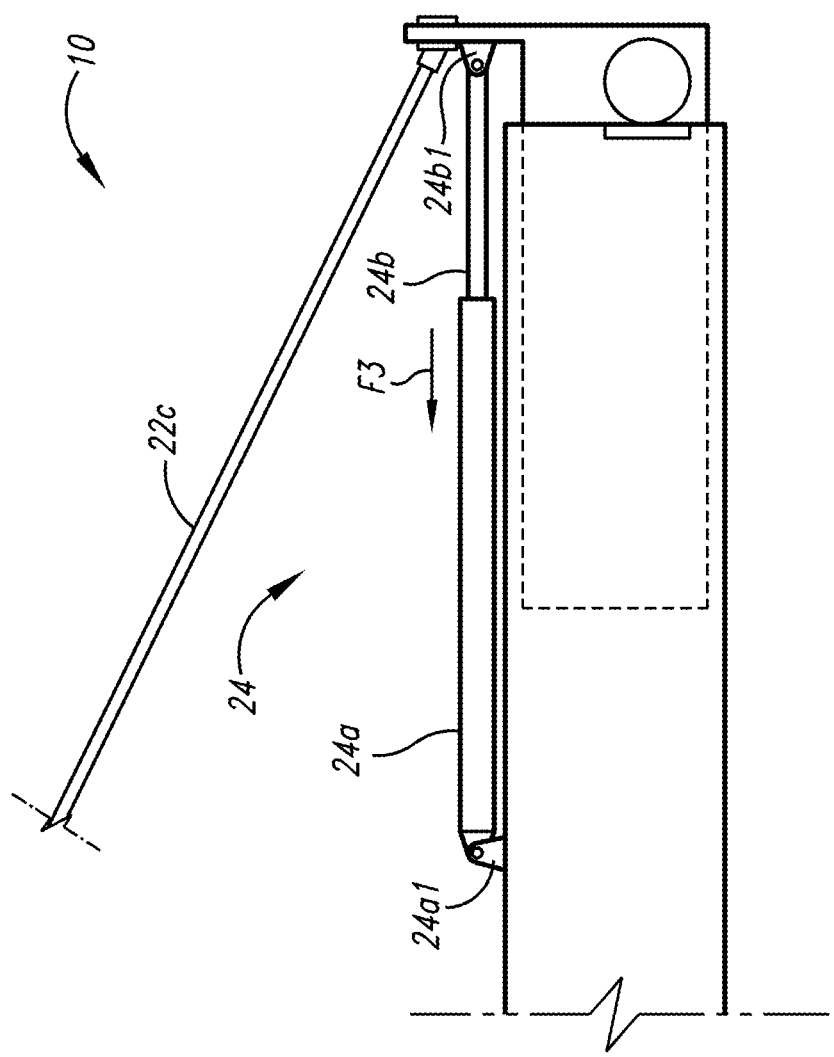
FIG. 22 is a partial side elevational view of the first foot peg elevational system.

Turning to FIG. 22, depicted therein is a partial sideelevational view of first footpeg elevational system 10. In implementations first footpeg elevational system 10 is shown to include force imparting assembly 24. In implementations, distal end 12*e*2 of footpeg 12*e* is farther from reference point 122*a* of seat 122 of self-propelled two-wheeled vehicle 100 than distal end 16*e*2 of footpeg 16 is to reference point 122*a* of seat 122 of self-propelled two-wheeled vehicle 100 when force in force direction F2 is less than force in force direction F1 by a threshold amount based at least in part on one or more of at least one spring force constant, at least one resistance force constant such as by pneumatic mechanisms, or both.

In implementations, force imparting assembly 24 is shown to include housing assembly 24*a* and rod member 24*b* in which housing assembly 24*a* imparts force in force direction F3 upon rod member 24*b*. In implementations housing assembly 24*a* is shown to include joint 24*a*1. In implementations rod member 24*b* is shown to include joint 24*b*1. In implementations rod member 24*b* imparts force on joint 24*b*1 in force direction F3 through pneumatic or spring based mechanism housed by housing assembly 24*a*. In implementations when forces are imparted on footpeg 12*e* and footpeg 16*e* along force direction F1 and force direction F2, respectively, these forces are countered by forces produced by force imparting assemblies such as force imparting assembly 24. In implementations, these countering forces can establish one or more thresholds to be overcome before footpeg 12e and footpeg 16e will move with respect to each other.

Figure 23:
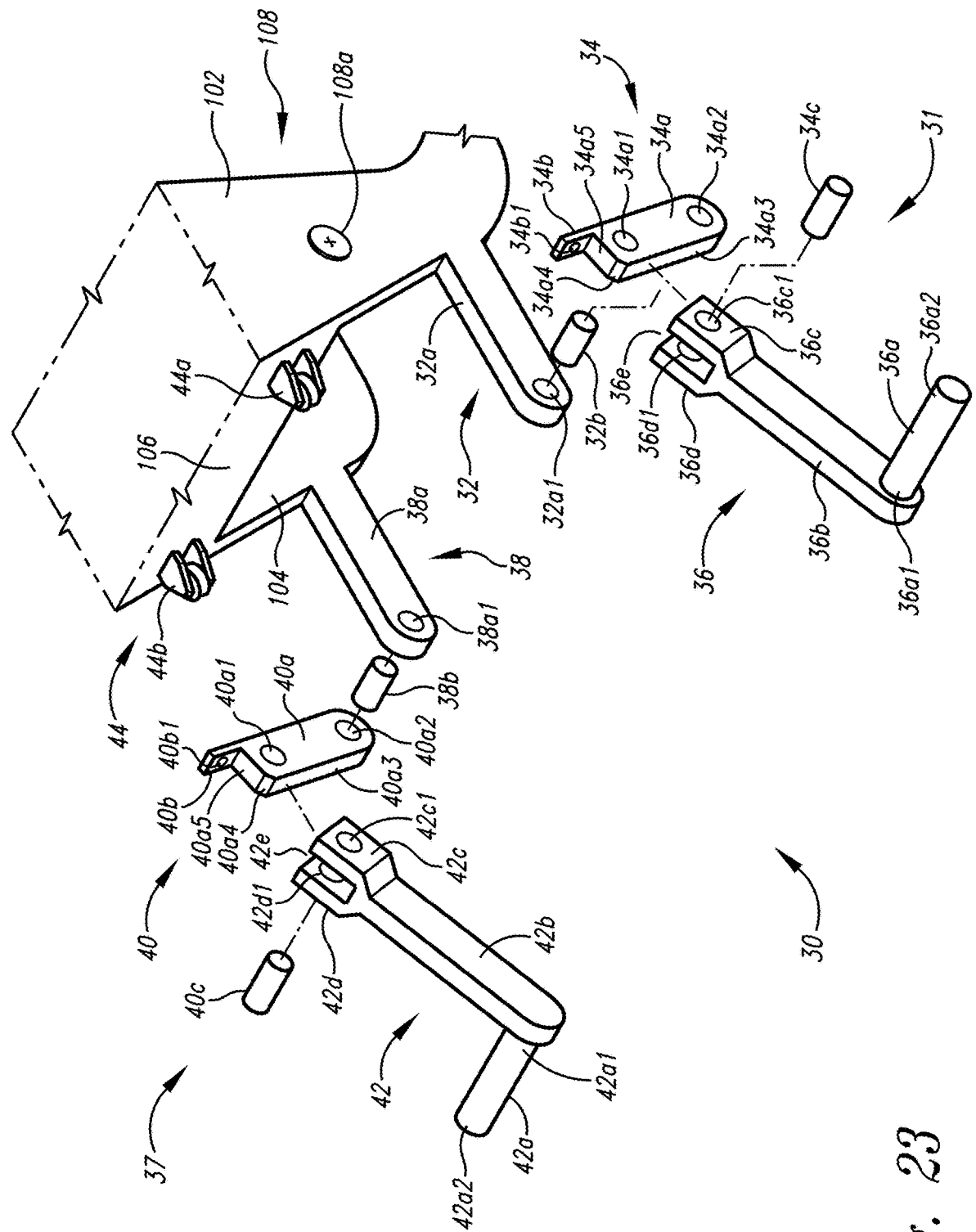
FIG. 23 is an exploded rear perspective view of a second foot peg elevational system coupled with a partial rear perspective view of the self-propelled two-wheeled vehicle.

Turning to FIG. 23, depicted therein is an exploded rear perspective view of second footpeg elevational system 30 coupled with a partial rear perspective view of self-propelled two-wheeled vehicle 100. Depicted implementation of second footpeg elevational system 30 is shown to include arm assembly 31, arm assembly 37, and cable assembly 44. Depicted implementation of arm assembly 31 is shown to include proximal member 32, intermediate member 34, and distal member 36. Depicted implementation of proximal member 32 is shown to include elongated portion 32a, aperture 32a1, and pin 32b.

Depicted implementation of intermediate member 34 is shown to include elongated portion 34a, aperture 34a1, aperture 34a2, side edge 34a3, beveled edge 34a4, end edge 34a5, extended portion 34b, aperture 34b1, and pin 34c. Depicted implementation of distal member 36 is shown to include footpeg 36a, elongated portion 36b, branch portion 36c, aperture 36c1, branch portion 36d, aperture 36d1, and gap 36e. Depicted implementation of arm assembly 37 is shown to include proximal member 38, intermediate member 40, and distal member 42.

Depicted implementation of proximal member 38 is shown to include elongated portion 38a, aperture 38a1, and pin 38b. Depicted implementation of intermediate member 40 is shown to include elongated portion 40a, aperture 40a1, aperture 40a2, side edge 40a3, beveled edge 40a4, end edge 40a5, extended portion 40b, aperture 40b1, and pin 40c. Depicted implementation of distal member 42 is shown to include footpeg 42a, elongated portion 42b, branch portion 42c, aperture 42c1, branch portion 42d, aperture 42d1, and gap 42e. Depicted implementation of cable assembly 44 is shown to include pulley 44a and pulley 44b.

Figure 24:
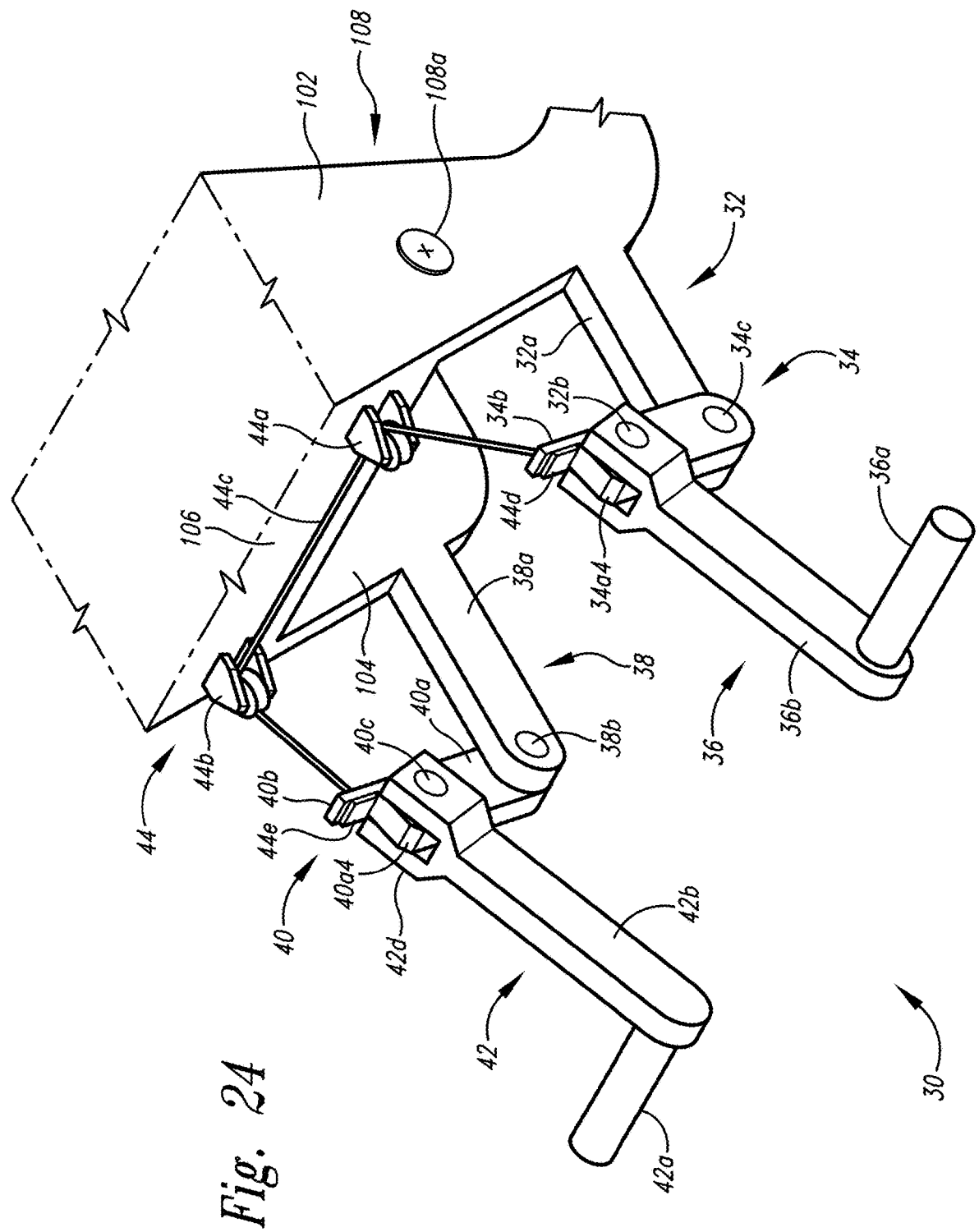
FIG. 24 is a rear perspective view of the second foot peg elevational system coupled with a partial rear perspective view of the self-propelled two-wheeled vehicle in a neutral orientation.

Turning to FIG. 24, depicted therein is a rear perspective view of second footpeg elevational system 30 coupled with a partial rear perspective view of self-propelled two-wheeled vehicle 100 in a neutral orientation. Depicted implementation of cable assembly 44 is shown to include cable 44c, stop portion 44d, and stop portion 44e. In implementations, when no force is being imparted upon footpeg 36a, and no force is being imparted upon footpeg 42a, then footpeg 36a and footpeg 42a are equidistant from reference point 122a of seat 122 of self-propelled two-wheeled vehicle 100.

In implementations, force applied in force direction F1 (see FIG. 12) onto footpeg 36a and force applied in force direction F2 (see FIG. 12) onto footpeg 42a oppose each other through coupling with cable assembly 44. As depicted, arm assembly 31 and arm assembly 37 are shown to be pivotally coupled to self-propelled two-wheeled vehicle 100, so footpeg 36a and footpeg 42a are pivotally coupled to self-propelled two-wheeled vehicle 100. In implementations, when no force is being imparted upon footpeg 36a, and no force is being imparted upon footpeg 42a, then footpeg 36a and footpeg 42a are equidistant from reference point 122a of seat 122 of self-propelled two-wheeled vehicle 100. In implementations, force applied in force direction F1 (see FIG. 12) onto footpeg 36a and force applied in force direction F2 (see FIG. 12) onto footpeg 42a oppose each other through coupling with cable assembly 44.

Figure 25:
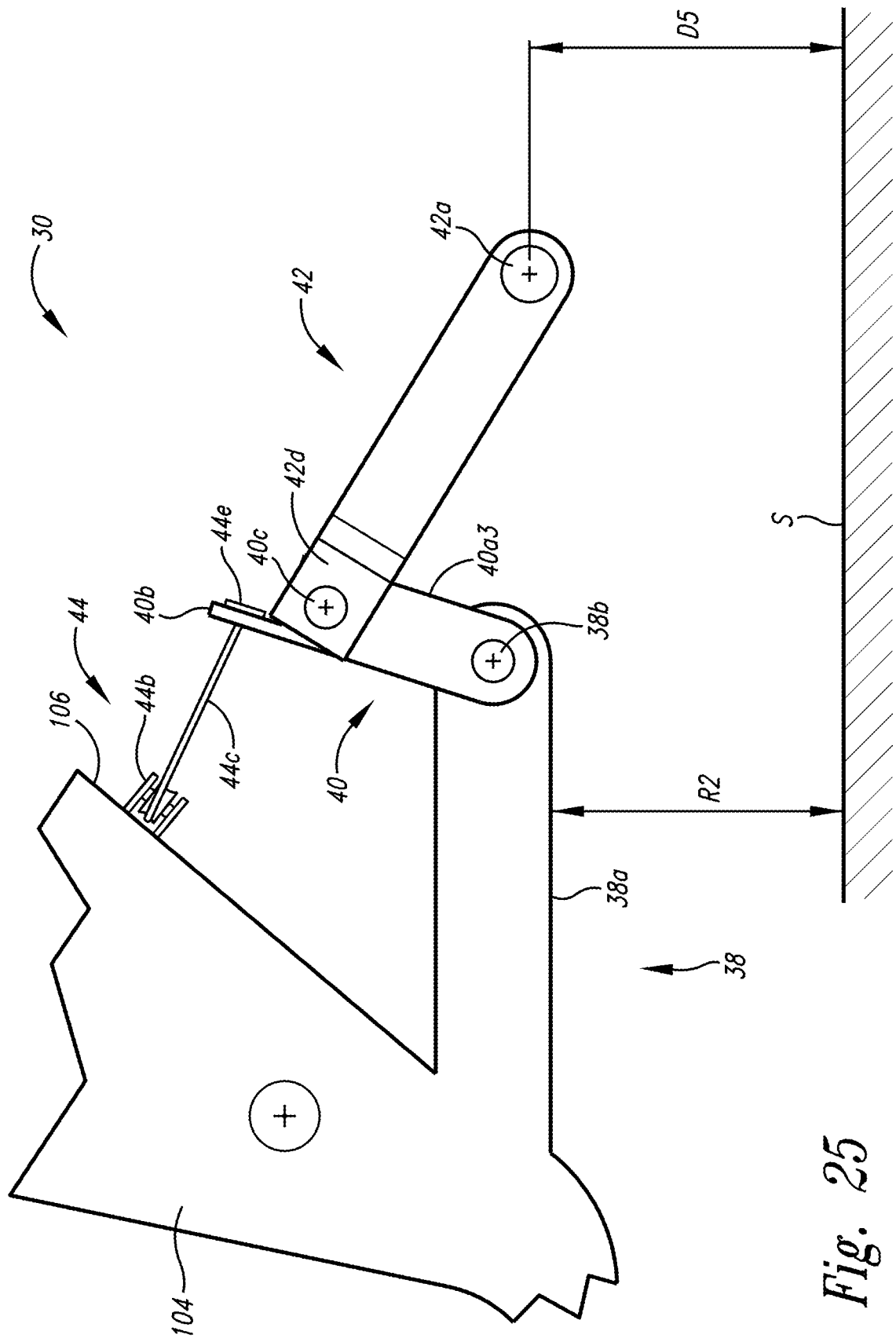
FIG. 25 is a left side elevational view of the second foot peg elevational system coupled with a partial left side elevational view of the self-propelled two-wheeled vehicle in a neutral orientation.

Turning to FIG. 25, depicted therein is a left side elevational view of second footpeg elevational system 30 coupled with a partial left side elevational view of self-propelled two-wheeled vehicle 100 in a neutral orientation shown to include distance D5 with respect to reference distance R2 and ground surface S.

Figure 26:
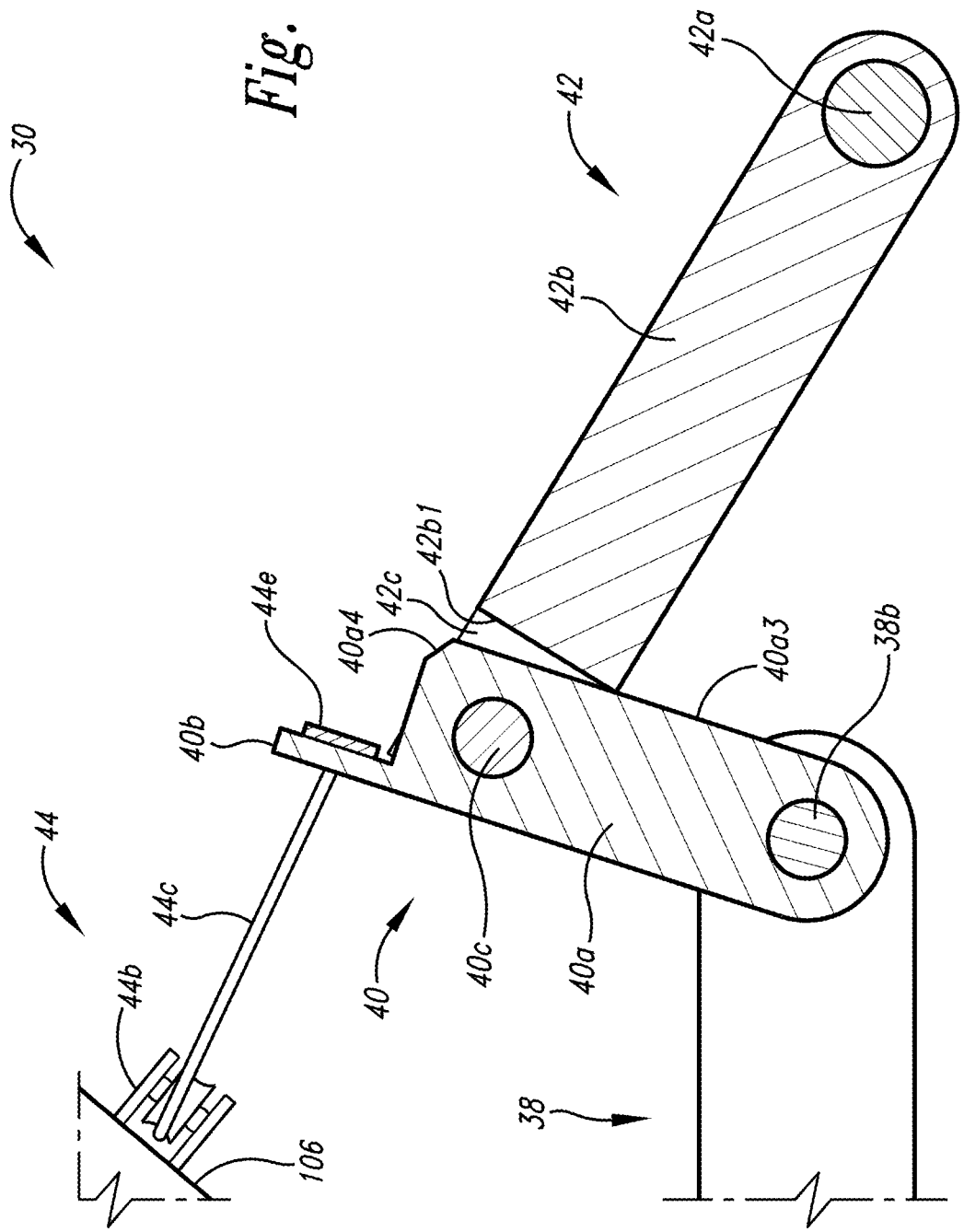
FIG. 26 is a partial left side elevational cross-sectional view of a portion of the second foot peg elevational system in a neutral orientation.

Turning to FIG. 26, depicted therein is a partial left side elevational cross-sectional view of second footpeg elevational system 30 in a neutral orientation wherein elongated portion 42b includes end edge 42b1, in which is a portion of end edge 42b1 is contacting a portion of side edge 40a3.

Figure 27:
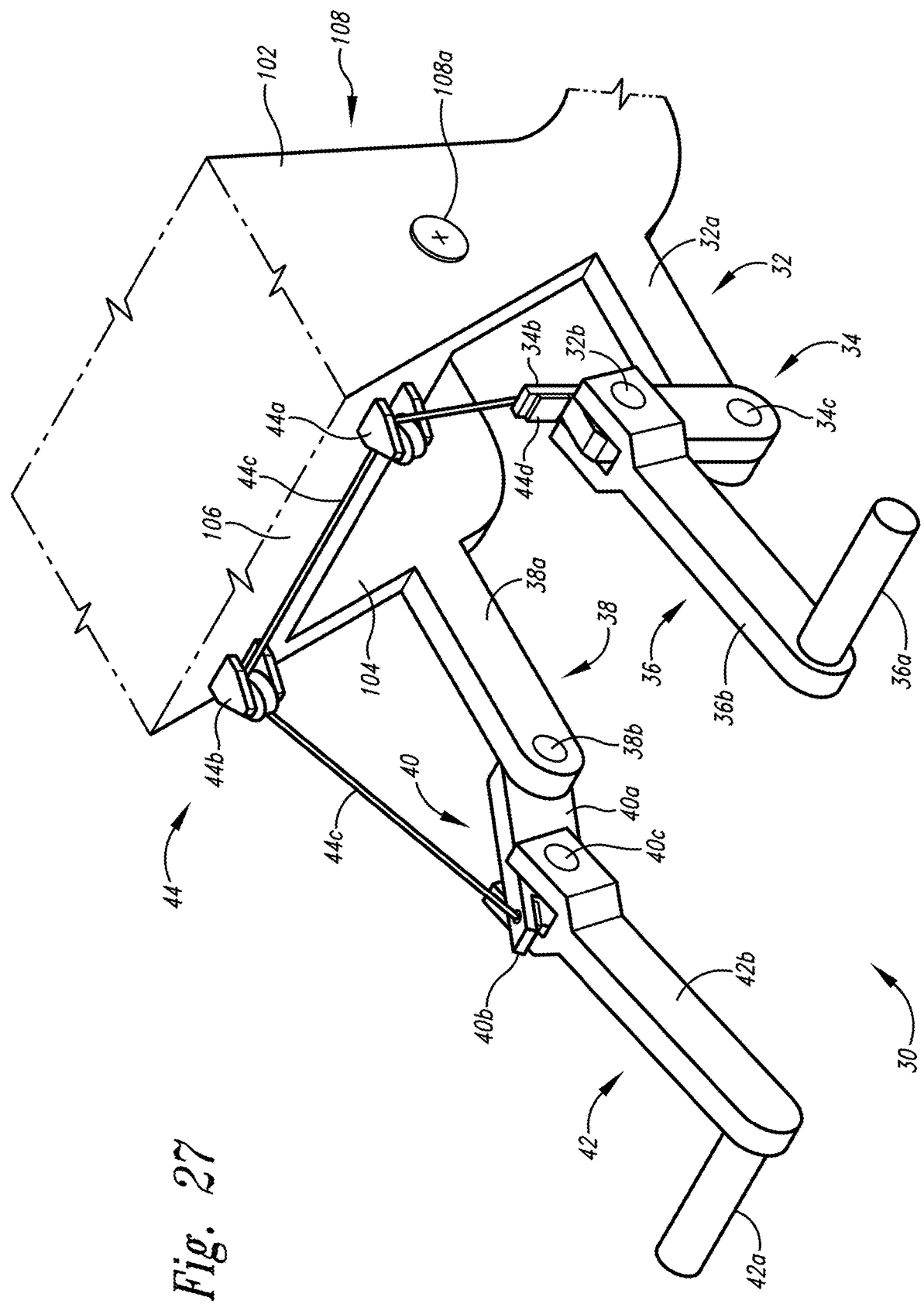
FIG. 27 is a rear perspective view of the second foot peg elevational system coupled with a partial rear perspective view of the self-propelled two-wheeled vehicle in a right-leaning orientation.

Turning to FIG. 27, depicted therein is a rear perspective view of second footpeg elevational system 30 coupled with a partial rear perspective view of self-propelled two-wheeled vehicle 100 in a right-leaning orientation. In implementations, when force in force direction F1 (see FIG. 12) is being imparted on footpeg 36a and force in force direction F2 (see FIG. 12) is being imparted on footpeg 42a then the footpeg 36a is closer to reference point 122a of seat 122 of self-propelled two-wheeled vehicle 100 than footpeg 42a is to reference point 122a when force in force direction F2 (see FIG. 12) is greater than force in force direction F1 (see FIG. 12), which in some implementations can include a threshold amount based at least in part on at least one material friction coefficient such a involving components of distal member 36 and distal member 42 or involving rotatable coupling of distal member 36 and distal member 42 with self-propelled two-wheeled vehicle 100.

In implementations, when force in force direction F1 (see FIG. 12) is being imparted on footpeg 36a and force in force direction F2 (see FIG. 12) is being imparted on footpeg 42a then the footpeg 36a is closer to reference point 122a of seat 122 of self-propelled two-wheeled vehicle 100 than footpeg 42a is to reference point 122a when force in force direction F2 (see FIG. 12) is greater than force in force direction F1 (see FIG. 12), which in some implementations can include a threshold amount based at least in part on at least one material friction coefficient such a involving components of distal member 36 and distal member 42 or involving rotatable coupling of distal member 36 and distal member 42 with self-propelled two-wheeled vehicle 100.

Figure 28:
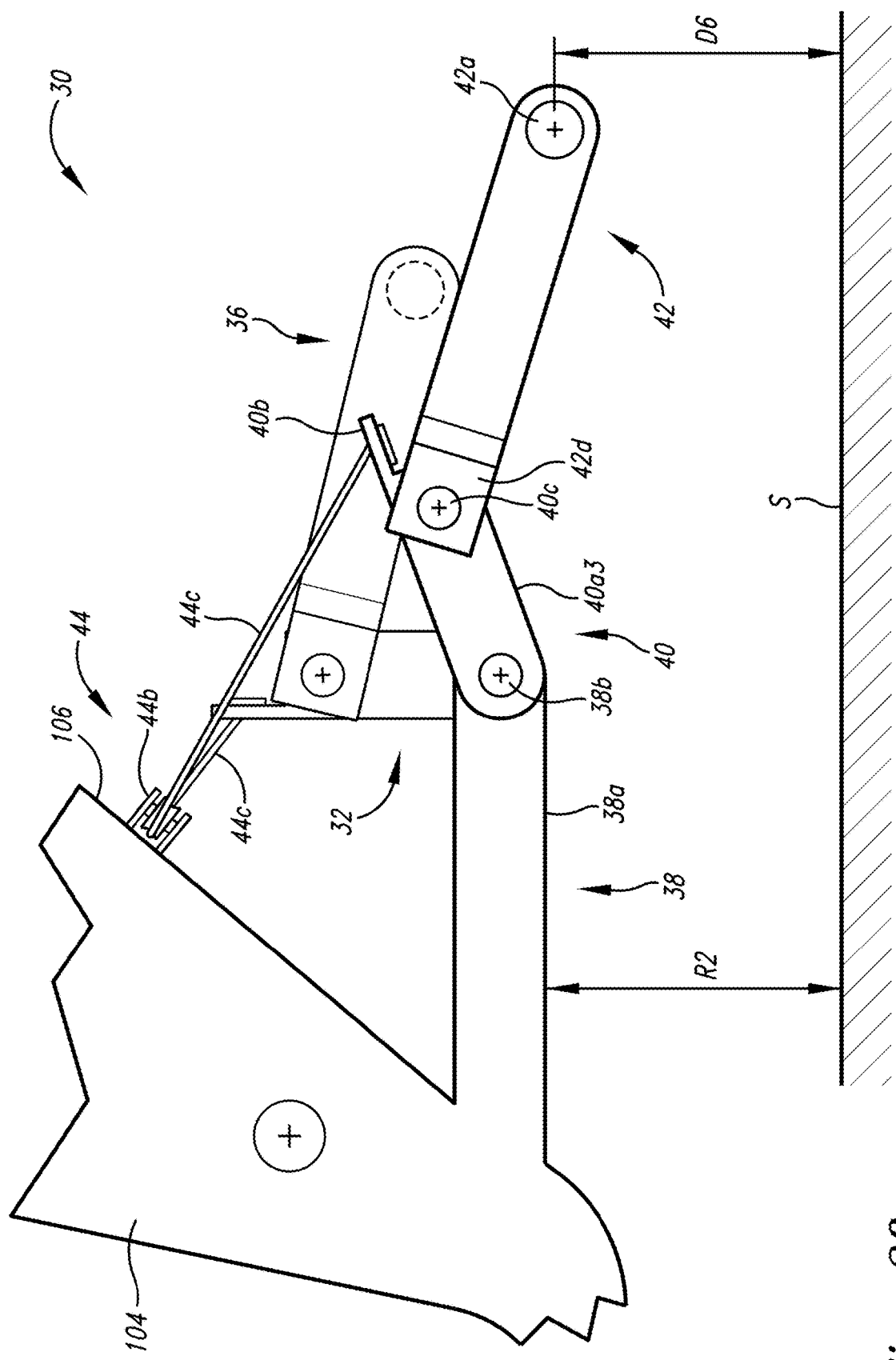
FIG. 28 is a left side elevational view of the second foot peg elevational system coupled with a partial left side elevational view of the self-propelled two-wheeled vehicle in a right-leaning orientation.

Turning to FIG. 28, depicted therein is a left side elevational view of second footpeg elevational system 30 coupled with a partial left side elevational view of self-propelled two-wheeled vehicle 100 in a right-leaning orientation shown to include distance D6 with respect to reference distance R2 and ground surface S.

Figure 29:
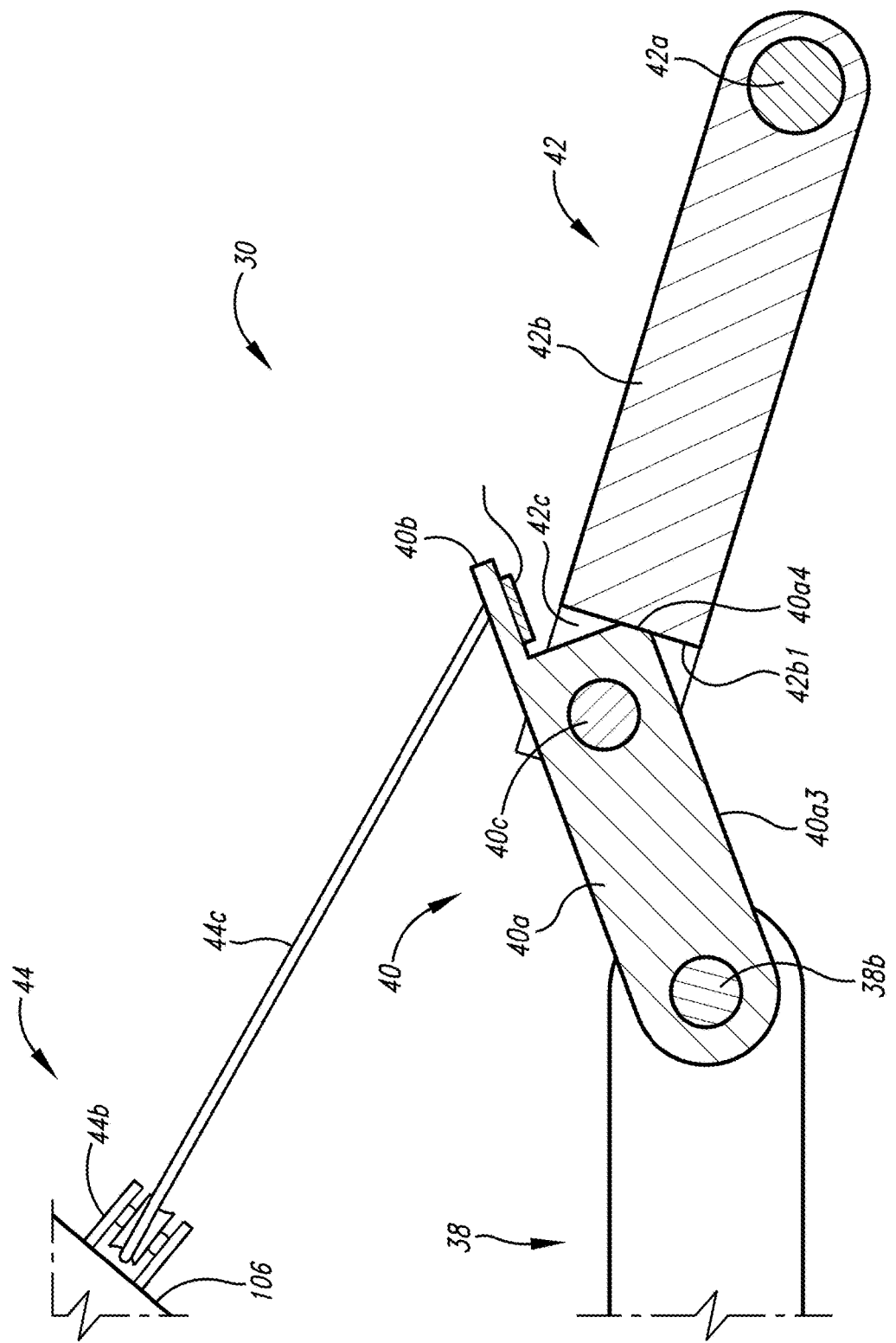
FIG. 29 is a partial left side elevational cross-sectional view of a portion of the second foot peg elevational system in a right-leaning orientation.

Turning to FIG. 29, depicted therein is a partial left side elevational cross-sectional view of a portion of second footpeg elevational system 30 in a right-leaning orientation wherein a portion of end edge 42b1 is contacting beveled edge 40a4.

Figure 30:
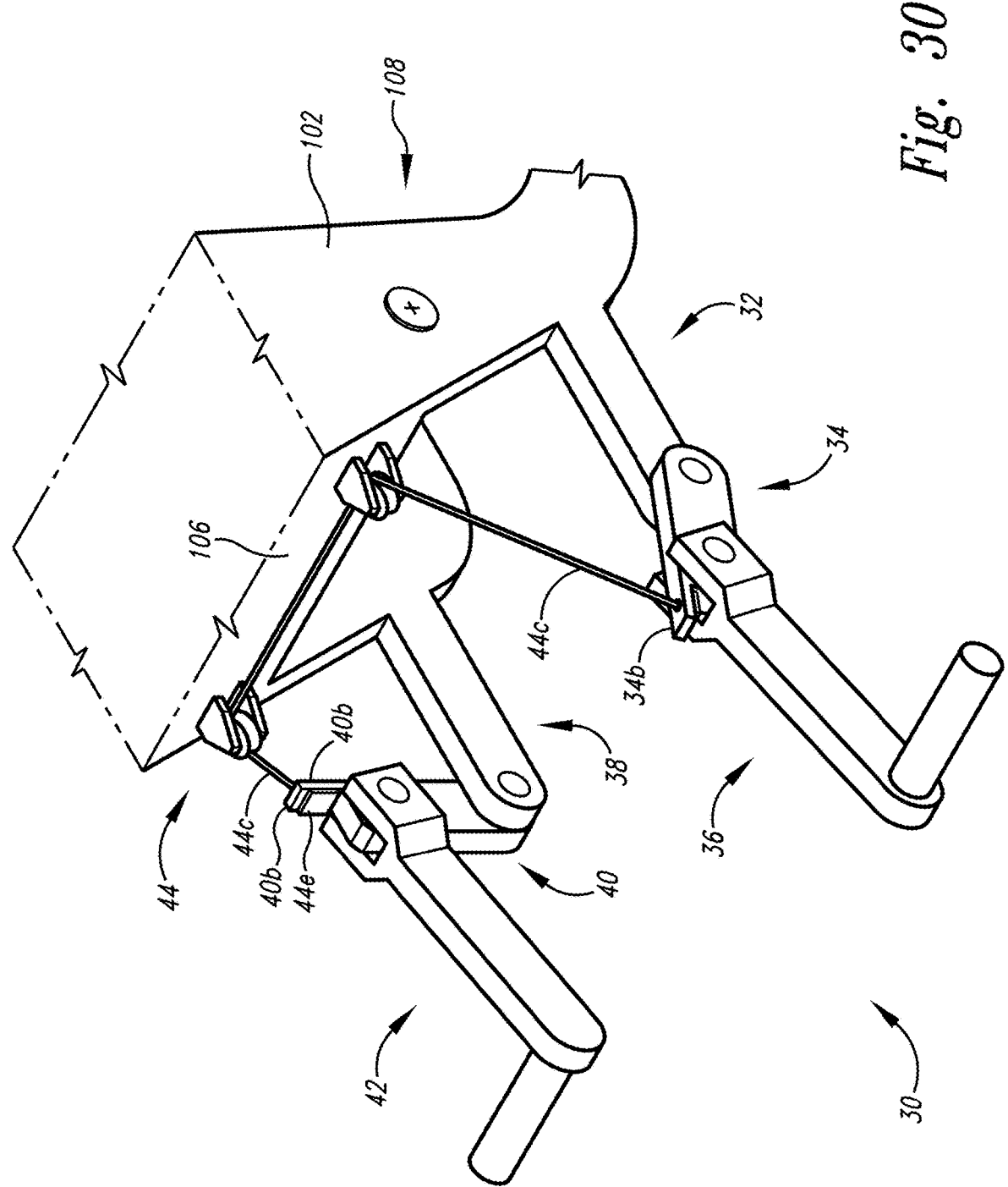
FIG. 30 is a rear perspective view of the second foot peg elevational system coupled with a partial rear perspective view of the self-propelled two-wheeled vehicle in a left-leaning orientation.

Turning to FIG. 30, depicted therein is a rear perspective view of second footpeg elevational system 30 coupled with a partial rear perspective view of self-propelled two-wheeled vehicle 100 in a left-leaning orientation.

Figure 31:
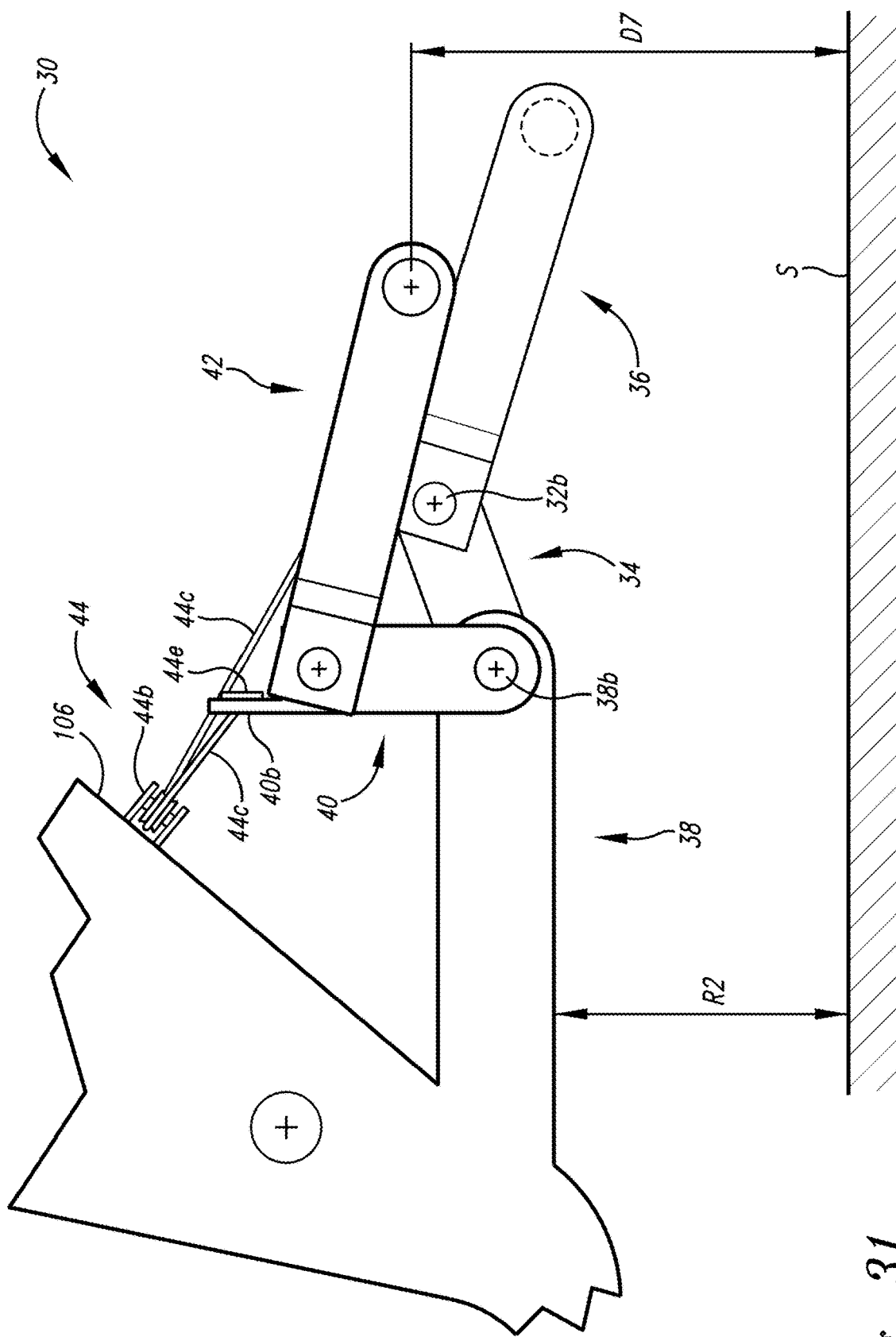
FIG. 31 is a left side elevational view of the second foot peg elevational system coupled with a partial left side elevational view of the self-propelled two-wheeled vehicle in a left-leaning orientation.

Turning to FIG. 31, depicted therein is a left side elevational view of second footpeg elevational system 30 coupled with a partial left side elevational view of self-propelled two-wheeled vehicle 100 in a left-leaning orientation shown to include distance D7 with respect to reference distance R2 and ground surface S.

Figure 32:
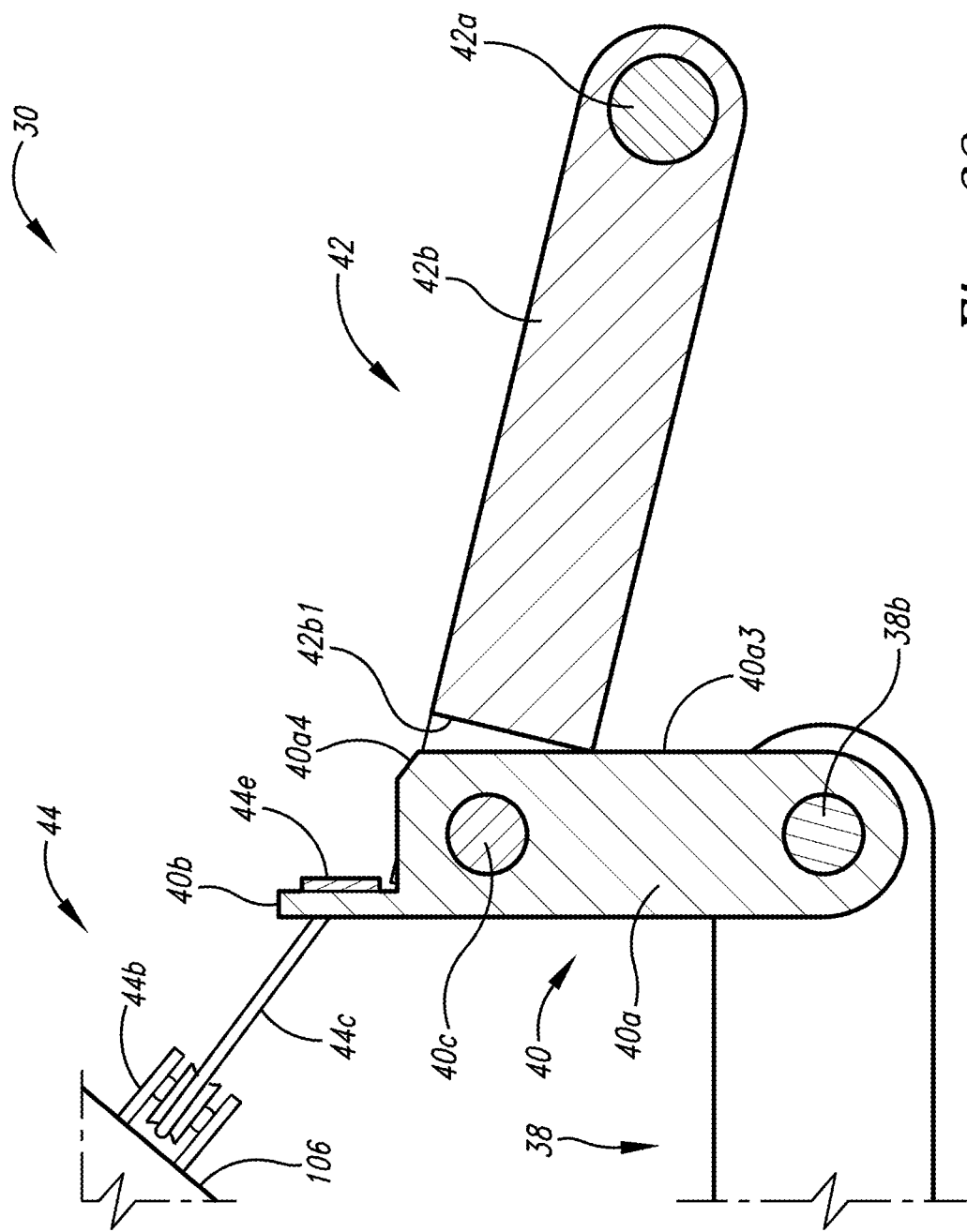
FIG. 32 is a partial left side elevational cross-sectional view of a portion of the second foot peg elevational system in a left-leaning orientation.

Turning to FIG. 32, depicted therein is a partial left side elevational cross-sectional view of a portion of second footpeg elevational system 30 in a left-leaning orientation. As depicted such as between FIGS. 26, 29, and 32 elongated portion 40a and elongated portion 42b rotate less than at most 180 degrees with respect to one another.

Figure 33:
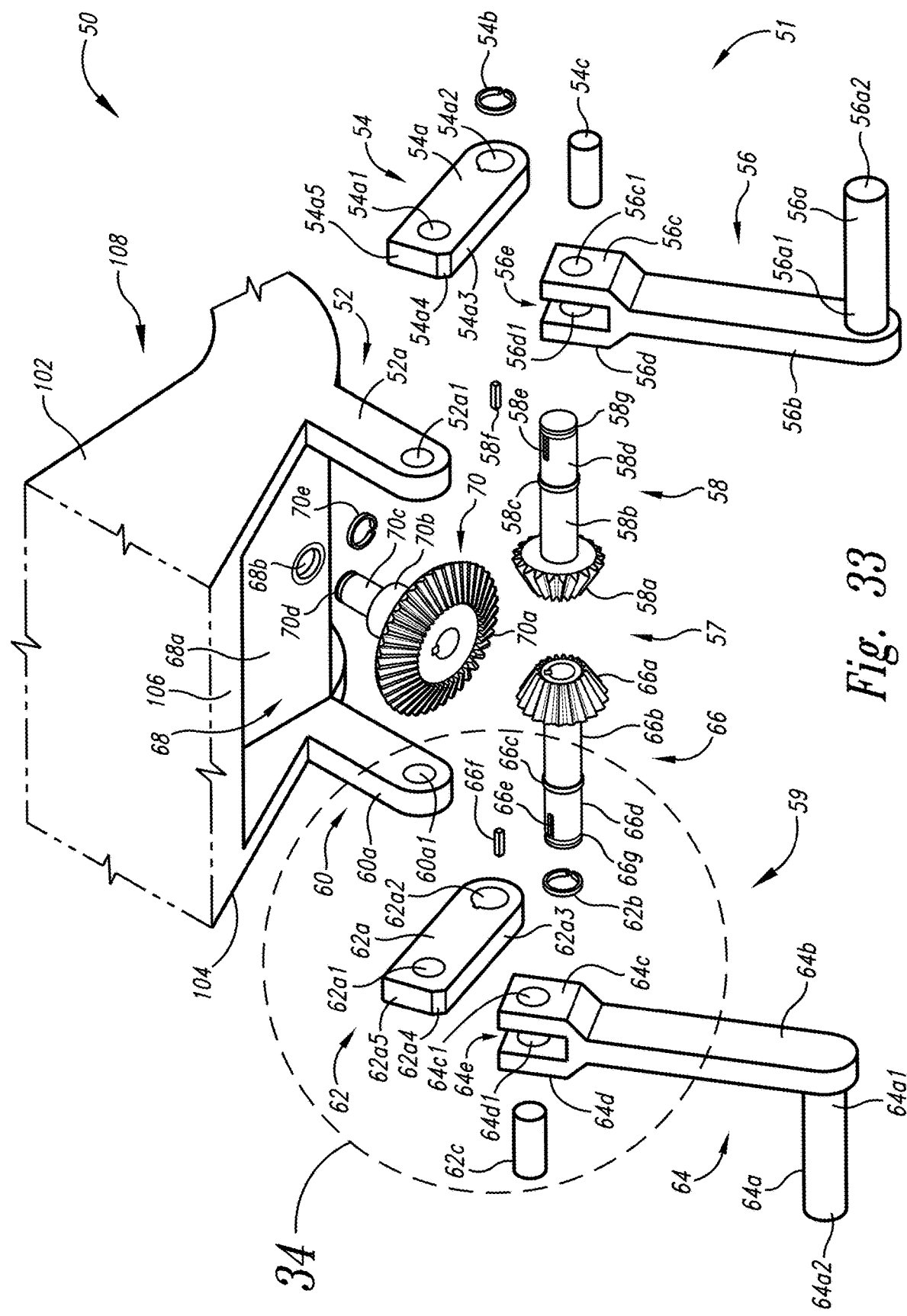
FIG. 33 is an exploded rear perspective view of a third foot peg elevational system coupled with a partial rear perspective view of the self-propelled two-wheeled vehicle.

FIG. 33 is an exploded rear perspective view of third footpeg elevational system 50 coupled with a partial rear perspective view of self-propelled two-wheeled vehicle 100. Depicted implementation of third footpeg elevational system 50 is shown to include arm assembly 51, gear train 57, arm assembly 59, and backplate member 68. Depicted implementation of arm assembly 51 is shown to include proximal member 52, intermediate member 54, and distal member 56. Depicted implementation of proximal member 52 is shown to include elongated portion 52a, and aperture 52a1.

Depicted implementation of intermediate member 54 is shown to include elongated portion 54a, aperture 54a1, aperture 54a2, side edge 54a3, beveled edge 54a4, end edge 54a5, retaining ring 54b, aperture 34b1, and pin 54c. Depicted implementation of distal member 56 is shown to include footpeg 56a, elongated portion 56b, branch portion 56c, aperture 56c1, branch portion 56d, aperture 56d1, and gap 56e. Depicted implementation of gear train 57 is shown to include gear member 58, gear member 66, and central gear member 70.

Depicted implementation of gear member 58 is shown to include bevel gear 58a, proximal rod portion 58b, circumferential rim 58c, side edge 54a3, distal rod portion 58d, slot 58e, key 58f, and circumferential groove 58g. Depicted implementation of gear member 66 is shown to include bevel gear 66a, proximal rod portion 66b, circumferential rim 66c, distal rod portion 66d, slot 66e, key 66f, and circumferential groove 66g. Depicted implementation of central gear member 70 is shown to include gear 70a, proximal rod portion 70b, distal rod portion 70c, and circumferential groove 70d.

Depicted implementation of arm assembly 59 is shown to include proximal member 60, intermediate member 62, and distal member 64. Depicted implementation of proximal member 60 is shown to include elongated portion 60a, and aperture 60a1. Depicted implementation of intermediate member 62 is shown to include elongated portion 62a, aperture 62a1, aperture 62a2, side edge 62a3, beveled edge 62a4, end edge 62a5, retaining ring 62b, and pin 62c.

Figure 34:
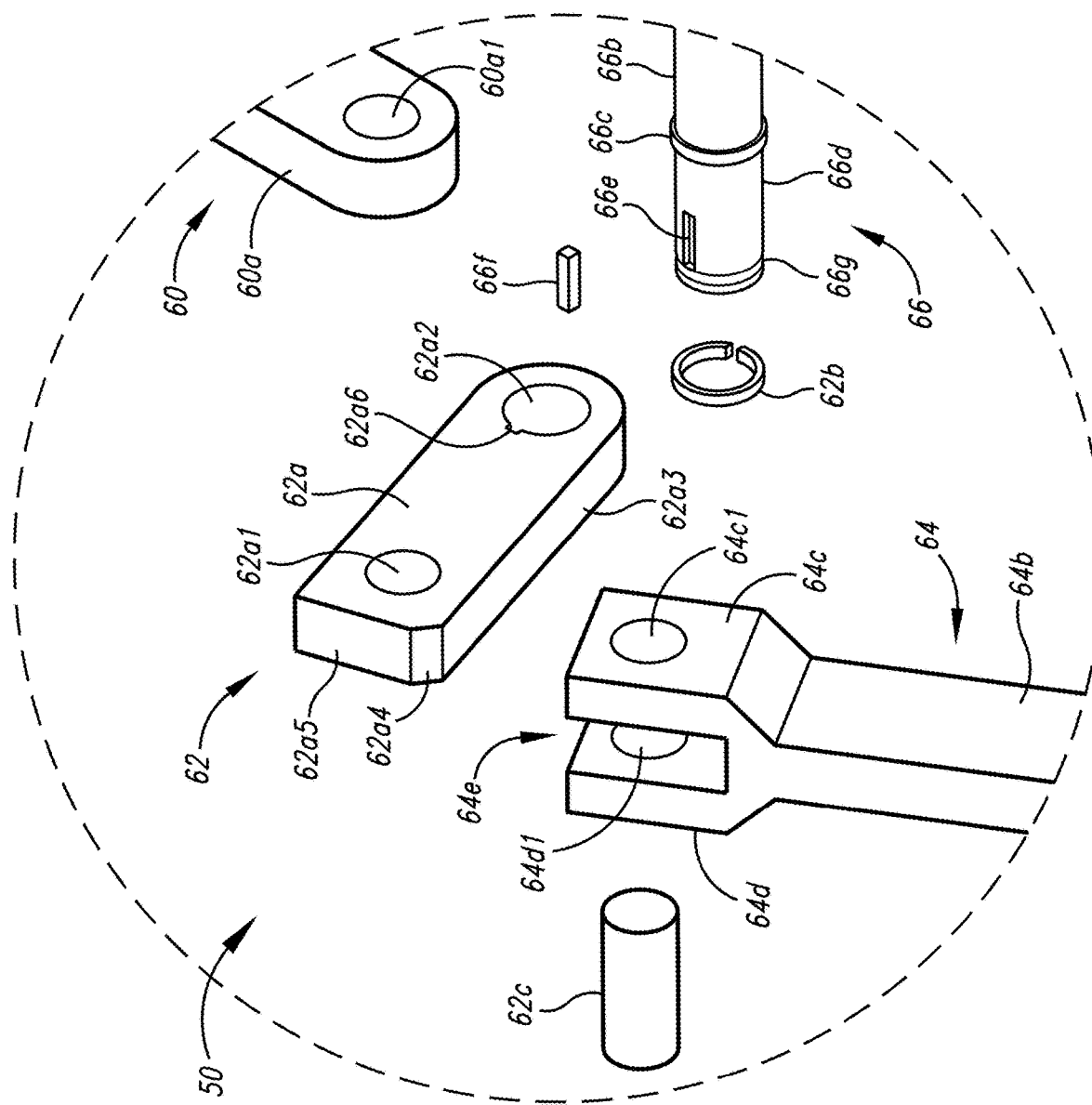
FIG. 34 is an enlarged exploded rear perspective view of a portion of the third foot peg elevational system taken along dashed outline 34 of FIG. 33.

Depicted implementation of distal member 64 is shown to include footpeg 64a, elongated portion 64b, branch 64c, aperture 64c1, branch portion 64d, aperture 64d1, and gap 64e. Depicted implementation of backplate member 68 is shown to include backplate 68a and aperture 68b. FIG. 34 is an enlarged exploded rear perspective view of a portion of third footpeg elevational system 50 taken along dashed outline 34 of FIG. 33. Depicted implementation of elongated portion 62a is shown to include notch 62a6.

Figure 35:
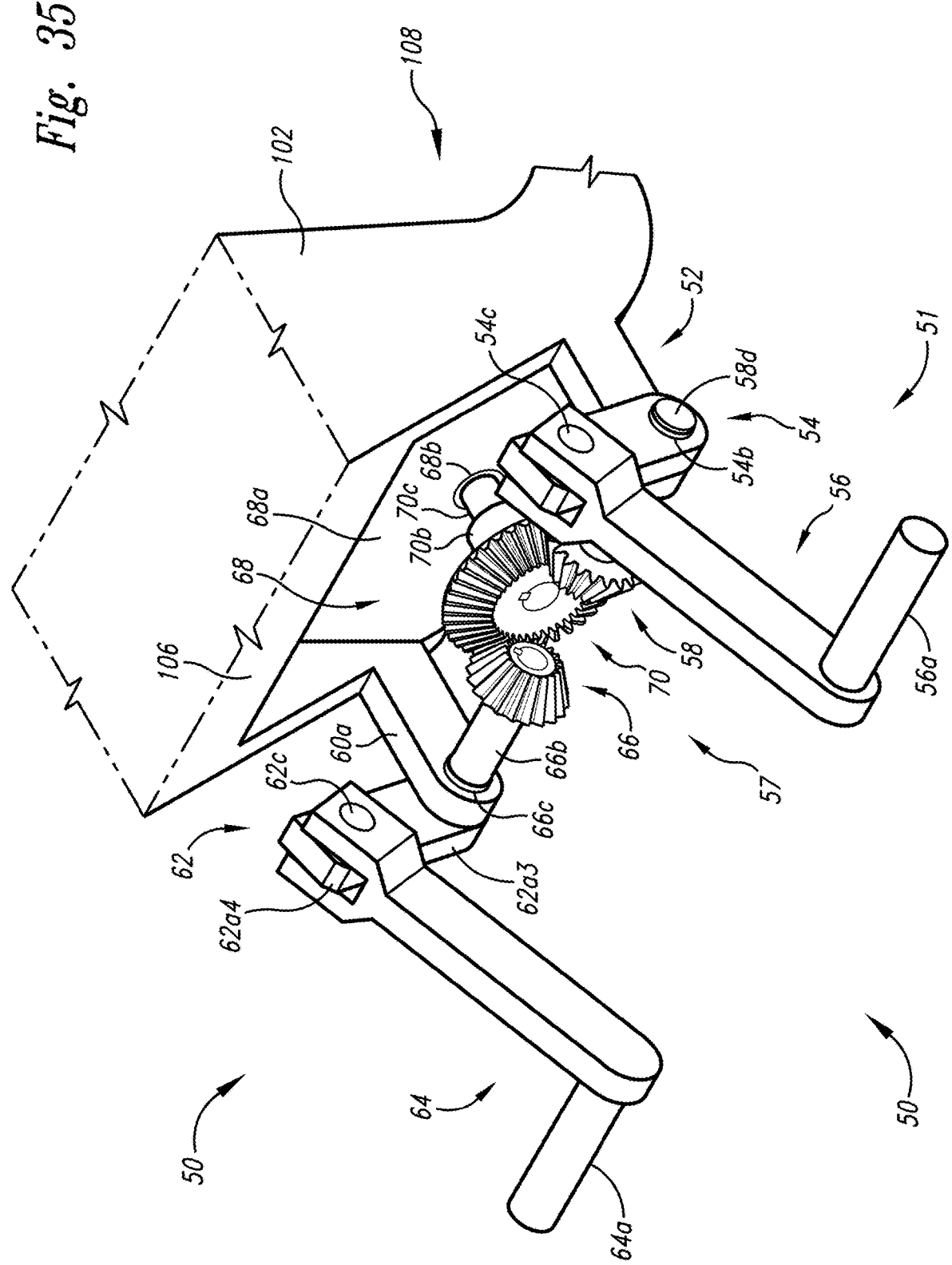
FIG. 35 is a rear perspective of the third foot peg elevational system coupled with a partial rear perspective view of the self-propelled two-wheeled vehicle in a neutral orientation.

FIG. 35 is a rear perspective of third footpeg elevational system 50 coupled with a partial rear perspective view of self-propelled two-wheeled vehicle 100 in a neutral orientation. In implementations, when no force is being imparted upon footpeg 56a, and no force is being imparted upon footpeg 64a, then footpeg 56a and footpeg 64a are equidistant from reference point 122a of seat 122 of self-propelled two-wheeled vehicle 100. In implementations, force applied in force direction F1 (see FIG. 12) onto footpeg 56a and force applied in force direction F2 (see FIG. 12) onto footpeg 64a oppose each other through coupling with drive train 57. Depicted implementation of gear train 57 is shown to include gear member 58, gear member 66, and central gear member 70 coupled together.

In implementations, when no force is being imparted upon footpeg 56a, and no force is being imparted upon footpeg 64a, then footpeg 56a and footpeg 64a are equidistant from reference point 122a of seat 122 of self-propelled two-wheeled vehicle 100. In implementations, force applied in force direction F1 (see FIG. 12) onto footpeg 56a and force applied in force direction F2 (see FIG. 12) onto footpeg 64a oppose each other through coupling with drive train 57.

Figure 36:
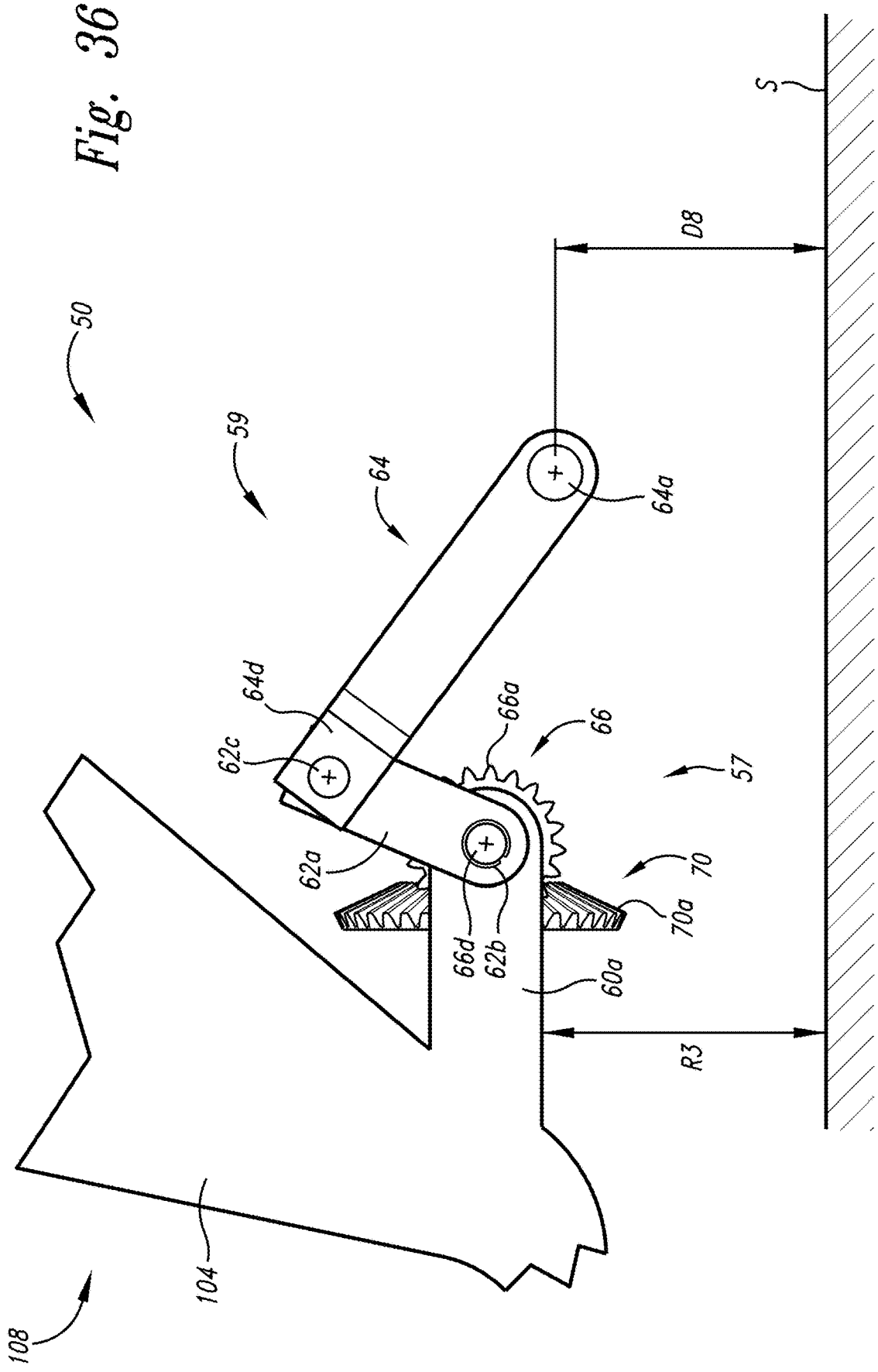
FIG. 36 is a left side elevational view of the third foot peg elevational system coupled with a partial left side elevational view of the self-propelled two-wheeled vehicle in a neutral orientation.

FIG. 36 is a left side elevational view of third footpeg elevational system 50 coupled with a partial left side elevational view of self-propelled two-wheeled vehicle 100 in a neutral orientation shown to include distance D8 with respect to reference distance R3 and ground surface S.

Figure 37:
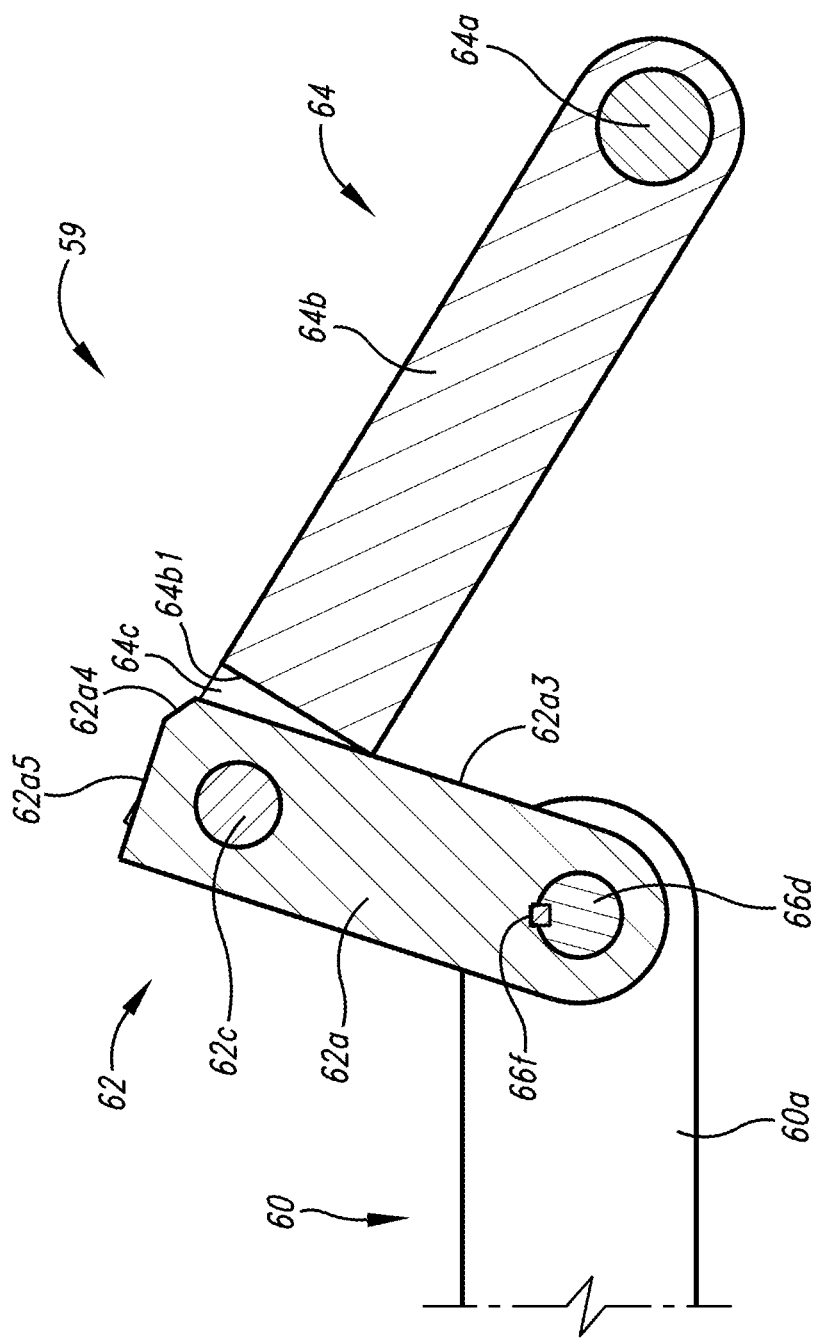
FIG. 37 is a partial left side elevational cross-sectional view of a portion of the third foot peg elevational system in a neutral orientation.

FIG. 37 is a partial left side elevational cross-sectional view of a portion of third footpeg elevational system 50 in a neutral orientation. Depicted implementation of elongated portion 64b is shown to include end edge 64b1.

Figure 38:
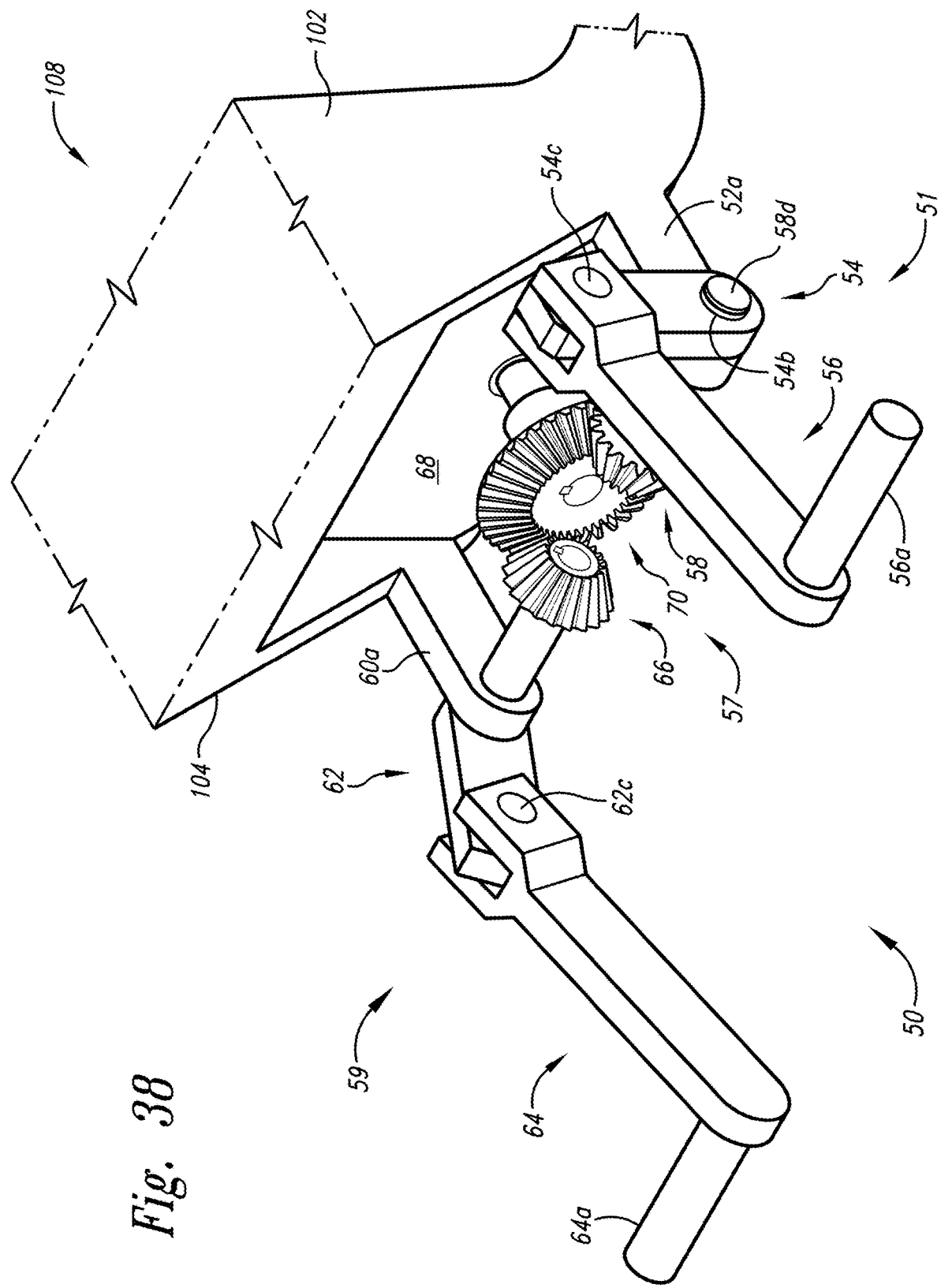
FIG. 38 is a rear perspective of the third foot peg elevational system coupled with a partial rear perspective view of the self-propelled two-wheeled vehicle in a right-leaning orientation.

FIG. 38 is a rear perspective of third footpeg elevational system 50 coupled with a partial rear perspective view of self-propelled two-wheeled vehicle 100 in a right-leaning orientation. In implementations, when force in force direction F1 (see FIG. 12) is being imparted on footpeg 56a and force in force direction F2 (see FIG. 12) is being imparted on footpeg 64a then the distal end 12e2 of footpeg 12e is closer to reference point 122a of seat 122 of self-propelled two-wheeled vehicle 100 than footpeg 56a is to reference point 122a when force in force direction F2 (see FIG. 12) is greater than force in force direction F1 (see FIG. 12), which in some implementations can include a threshold amount based at least in part on at least one material friction coefficient such a involving components of arm assembly 51 and arm assembly 59 or involving rotatable coupling of arm assembly 51 and arm assembly 59 with self-propelled two-wheeled vehicle 100.

In implementations, when force in force direction F1 (see FIG. 12) is being imparted on footpeg 56a and force in force direction F2 (see FIG. 12) is being imparted on footpeg 64a then the distal end 12e2 of footpeg 12e is closer to reference point 122a of seat 122 of self-propelled two-wheeled vehicle 100 than footpeg 56a is to reference point 122a when force in force direction F2 (see FIG. 12) is greater than force in force direction F1 (see FIG. 12), which in some implementations can include a threshold amount based at least in part on at least one material friction coefficient such a involving components of arm assembly 51 and arm assembly 59 or involving rotatable coupling of arm assembly 51 and arm assembly 59 with self-propelled two-wheeled vehicle 100.

Figure 39:
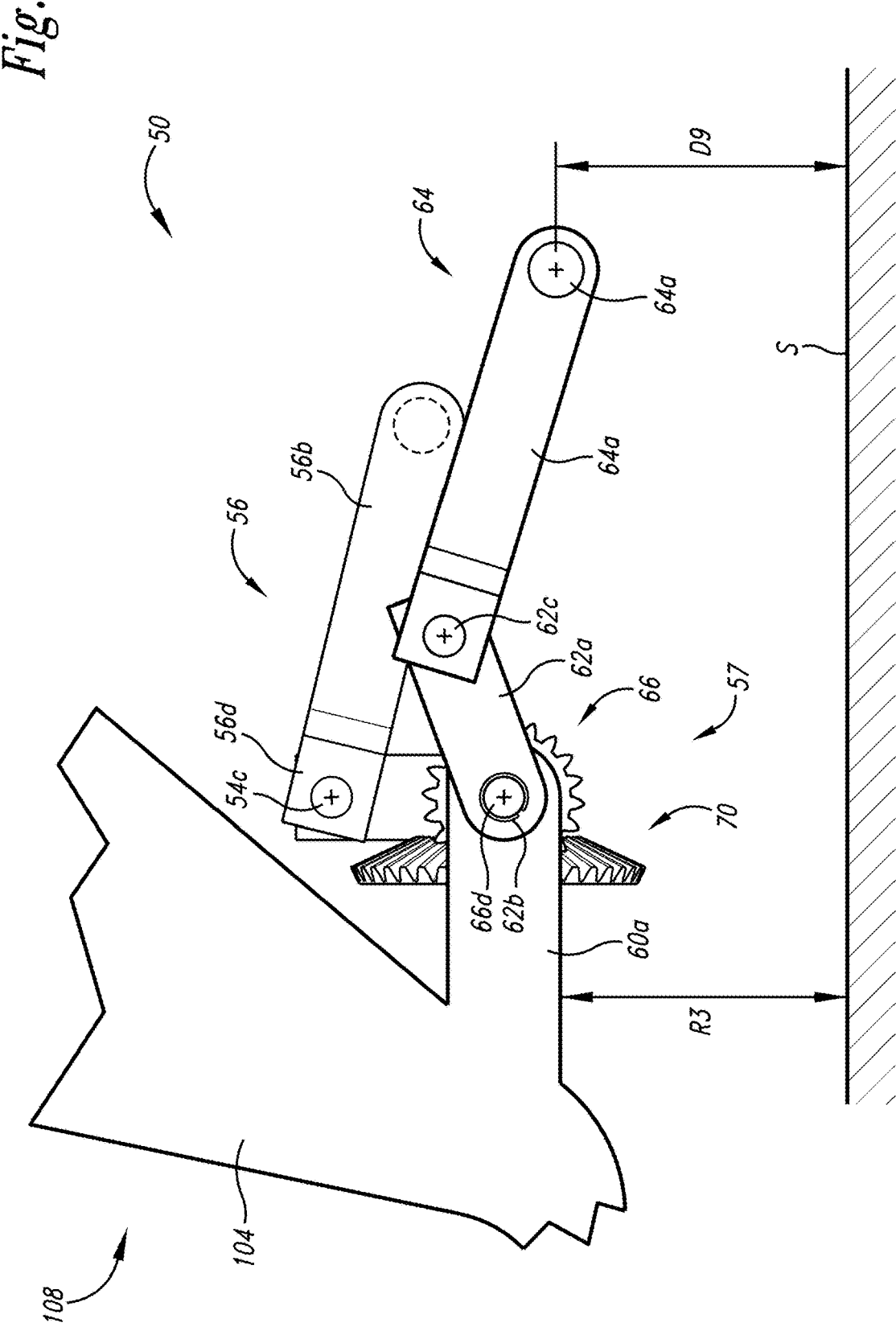
FIG. 39 is a left side elevational view of the third foot peg elevational system coupled with a partial left side elevational view of the self-propelled two-wheeled vehicle in a right-leaning orientation.

FIG. 39 is a left side elevational view of third footpeg elevational system 50 coupled with a partial left side elevational view of self-propelled two-wheeled vehicle 100 in a right-leaning orientation shown to include distance D9 with respect to reference distance R3 and ground surface S.

Figure 40:
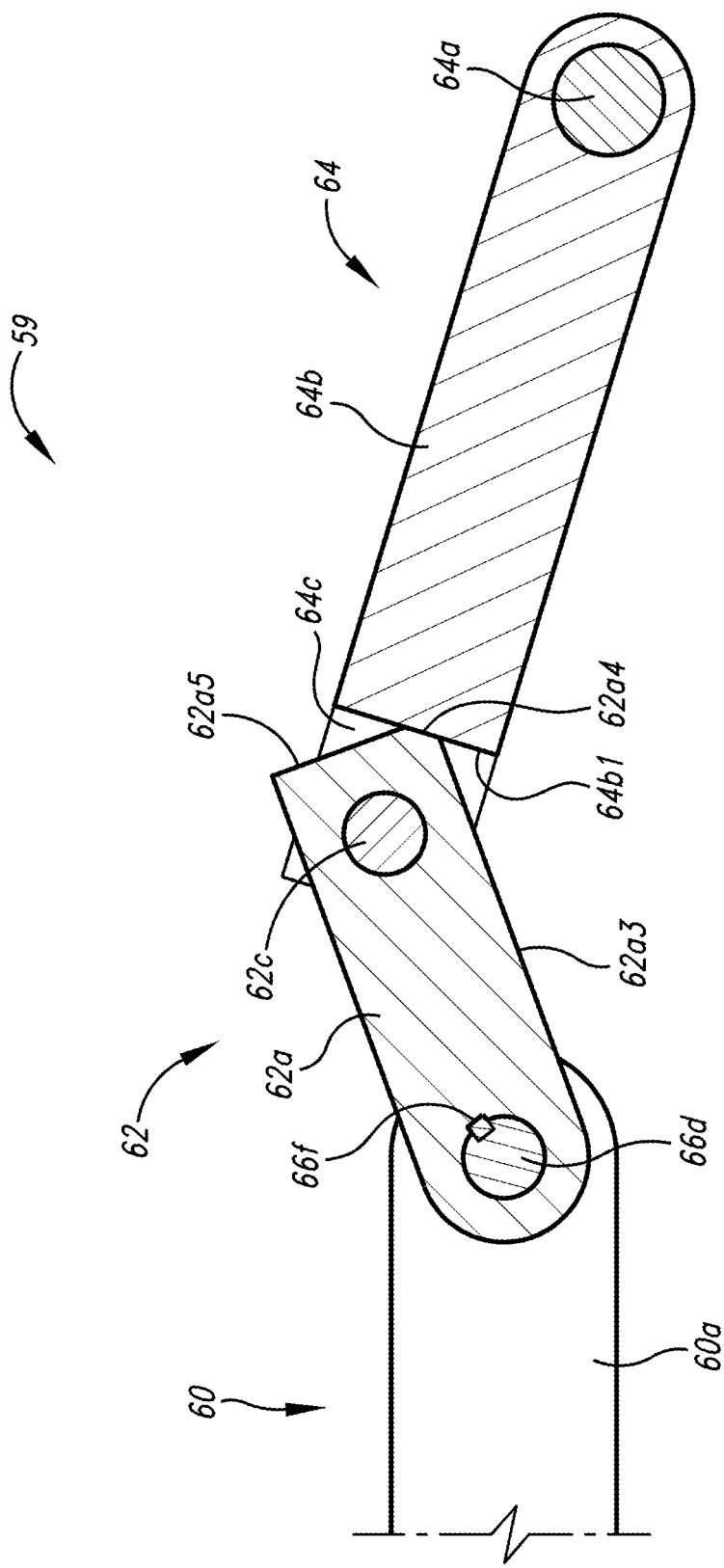
FIG. 40 is a partial left side elevational cross-sectional view of a portion of the third foot peg elevational system in a right-leaning orientation.

FIG. 40 is a partial left side elevational cross-sectional view of a portion of third footpeg elevational system 50 in a right-leaning orientation.

Figure 41:
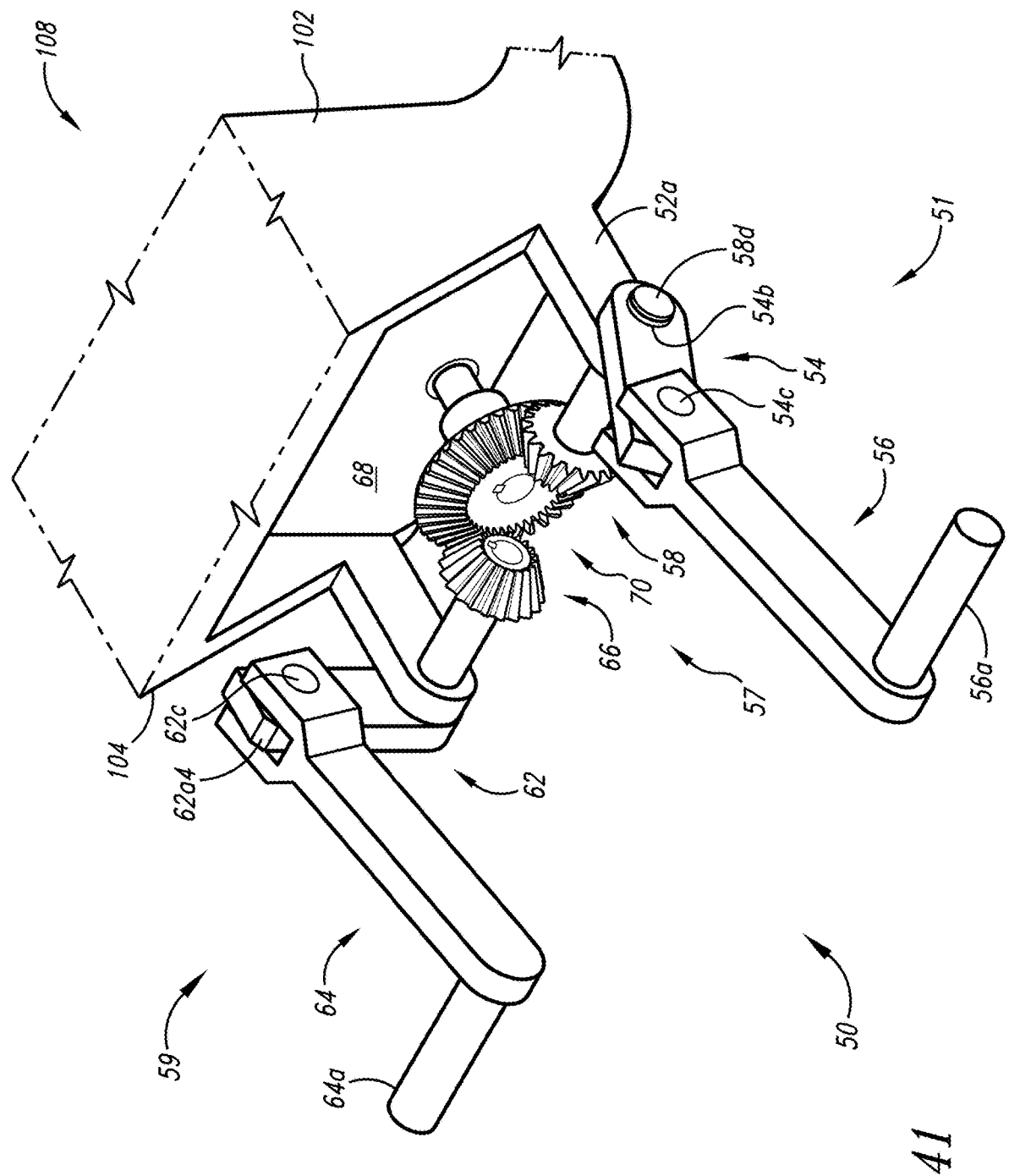
FIG. 41 is a rear perspective view of the third foot peg elevational system coupled with a partial rear perspective view of the self-propelled two-wheeled vehicle in a left-leaning orientation.

FIG. 41 is a rear perspective view of third footpeg elevational system 50 coupled with a partial rear perspective view of self-propelled two-wheeled vehicle 100 in a left-leaning orientation.

Figure 42:
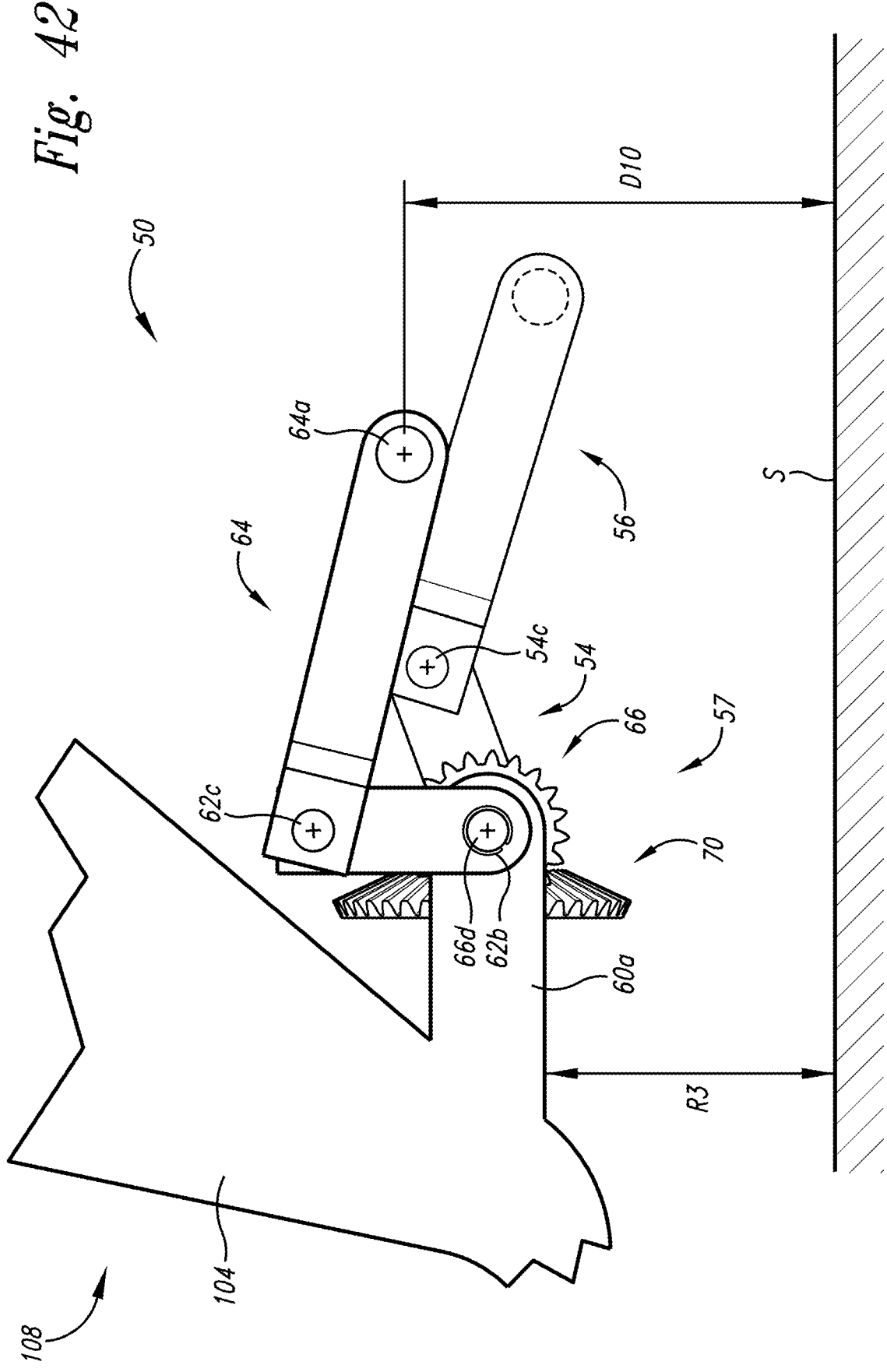
FIG. 42 is a left side elevational view of the third foot peg elevational system coupled with a partial left side elevational view of the self-propelled two-wheeled vehicle in a left-leaning orientation.

FIG. 42 is a left side elevational view of third footpeg elevational system 50 coupled with a partial left side elevational view of self-propelled two-wheeled vehicle 100 in a left-leaning orientation shown to include distance D10 with respect to reference distance R3 and ground surface S.

Figure 43:
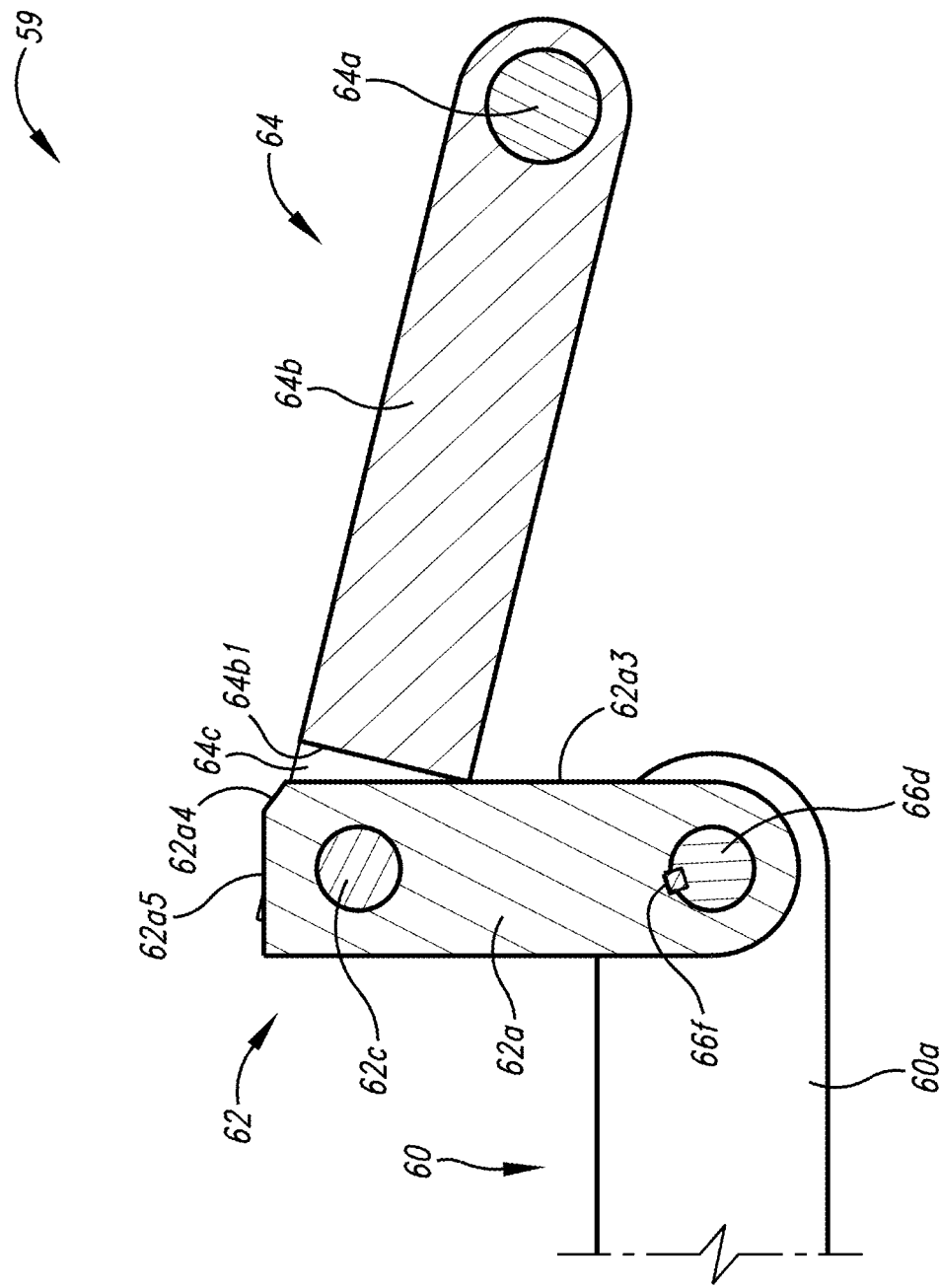
FIG. 43 is a partial left side elevational cross-sectional view of a portion of the third foot peg elevational system in a left-leaning orientation.

FIG. 43 is a partial left side elevational cross-sectional view of a portion of third footpeg elevational system 50 in a left-leaning orientation. As depicted such as between FIGS. 37, 40, and 43 elongated portion 40a and elongated portion 42b rotate less than at most 180 degrees with respect to one another.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have Alone, B alone, C alone, And B together, And C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have Alone, B alone, C alone, And B together, And C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "And B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A two-wheeled vehicle footpeg elevational system for a two-wheeled vehicle including a seat with a reference point, the two-wheeled vehicle footpeg elevational system comprising:
   (I) a first footpeg pivotally couplable to the two-wheeled vehicle, the first footpeg including a distal end; and
   (II) a second footpeg pivotally couplable to the two-wheeled vehicle, the second footpeg including a distal end,
   wherein the first footpeg is coupled with the second footpeg such that when the first footpeg and second footpeg are pivotally coupled to the two-wheel vehicle, the distal end of the first footpeg becomes closer to the reference point of the seat of the two-wheeled vehicle when the distal end of the second footpeg becomes farther from the reference point of the seat of the two-wheeled vehicle;
   (III) a first arm assembly pivotally couplable with the two-wheeled vehicle; and
   (IV) a second arm assembly pivotally couplable with the two-wheeled vehicle,
   wherein when the first arm assembly is pivotally coupled with the two-wheeled vehicle, the first footpeg is pivotally coupled to the two-wheel vehicle by being coupled to the first arm assembly,
   wherein when the second arm assembly is pivotally coupled with the two-wheeled vehicle, the second footpeg is pivotally coupled to the two-wheel vehicle by being coupled to the second arm assembly,
   wherein the first arm assembly includes a first inner arm member and a first outer arm member,
   wherein the first inner arm member is slidably coupled at least partially inside the first outer arm member configured to at least partially be extended out from the first outer arm member in a first position and to at least partially be contracted into the first outer arm member in a second position,
   wherein the second arm assembly includes a second inner arm member and a second outer arm member, and
   wherein the second inner arm member is slidably coupled at least partially inside of the second outer arm member configured to at least partially be extended out from the second outer arm in a first position and to at least partially be contracted into the second outer arm member in a second position.

2. The two-wheeled vehicle footpeg elevational system of claim 1,
   wherein the first arm assembly includes at least one first lubricant portion,
   wherein the first inner arm member has at least one exterior surface portion,
   wherein the first outer arm member has at least one interior surface portion in juxtaposition with the at least one exterior surface portion of the first inner arm member,
   wherein the at least one first lubricant portion is positioned between the at least one exterior surface portion of the first inner arm member and the at least one interior surface portion of the first outer arm member,
   wherein the second arm assembly includes at least one second lubricant portion, wherein the second inner arm member has at least one exterior surface portion, wherein the second outer arm member has at least one interior surface portion in juxtaposition with the at least one exterior surface portion of the second inner arm member, and wherein the at least one second lubricant portion is positioned between the at least one exterior surface portion of the second inner arm member and the at least one interior surface portion of the second outer arm member.

3. The two-wheeled vehicle footpeg elevational system of claim 1, wherein the first inner arm member has at least one exterior lubricant surface portion, wherein the first outer arm member has at least one interior lubricant surface portion adjacent with the at least one exterior lubricant surface portion of the first inner arm member, wherein the second inner arm member has at least one exterior lubricant surface portion, and wherein the second outer arm member has at least one interior lubricant surface portion adjacent with the at least one exterior lubricant surface portion of the second inner arm member.

4. The two-wheeled vehicle footpeg elevational system of claim 1, wherein when the first footpeg and second footpeg are pivotally coupled to the two-wheel vehicle, when no force is being imparted upon the first footpeg, and when no force is being imparted upon the second footpeg, then the first footpeg and the second footpeg are equidistant from the reference point of the seat of the two-wheeled vehicle.

5. The two-wheeled vehicle footpeg elevational system of claim 4, wherein when the first footpeg and second footpeg are pivotally coupled to the two-wheel vehicle, when a first force is being imparted on the first footpeg, and a second force is being imparted on the second footpeg then the distal end of the first footpeg is closer to the reference point of the seat of the two-wheeled vehicle than the distal end of the second footpeg is to the reference point of the seat of the two-wheeled vehicle when the second force is greater than the first force.

6. The two-wheeled vehicle footpeg elevational system of claim 4, wherein when the first footpeg and second footpeg are pivotally coupled to the two-wheel vehicle, when a first force is being imparted on the first footpeg, and a second force is being imparted on the second footpeg then the distal end of the first footpeg is closer to the reference point of the seat of the two-wheeled vehicle than the distal end of the second footpeg is to the reference point of the seat of the two-wheeled vehicle when the second force is greater than the first force by a threshold amount based at least in part on at least one material friction coefficient.

7. The two-wheeled vehicle footpeg elevational system of claim 4, wherein when the first footpeg and second footpeg are pivotally coupled to the two-wheel vehicle, when a first force is being imparted on the first footpeg, and a second force is being imparted on the second footpeg then the distal end of the first footpeg is farther from the reference point of the seat of the two-wheeled vehicle than the distal end of the second footpeg is to the reference point of the seat of the two-wheeled vehicle when the second force is less than the first force.

8. The two-wheeled vehicle footpeg elevational system of claim 4, wherein when a first force is imparted on the first footpeg and a second force is being imparted on the second footpeg then the distal end of the first footpeg is farther from the reference point of the seat of the two-wheeled vehicle than the distal end of the second footpeg is to the reference point of the seat of the two-wheeled vehicle when the second force is less than the first force by a threshold amount based at least in part on at least one spring force constant.

9. The two-wheeled vehicle footpeg elevational system of claim 4, further including a first bracket support couplable to the two-wheeled vehicle, and a second bracket support couplable to the two-wheeled vehicle, wherein when the first bracket support and the second bracket support are coupled to the two-wheeled vehicle and when the distal end of the first footpeg and the distal end of the second footpeg are equidistant to the reference point of the seat of the two-wheeled vehicle then the first arm assembly is in contact with the first bracket support and the second arm assembly is in contact with the second bracket support.

10. A two-wheeled vehicle footpeg elevational system for a two-wheeled vehicle including a seat with a reference point, the two-wheeled vehicle footpeg elevational system comprising:

(I) a first footpeg pivotally couplable to the two-wheeled vehicle, the first footpeg including a distal end;

(II) a second footpeg pivotally couplable to the two-wheeled vehicle, the second footpeg including a distal end, wherein the first footpeg is coupled with the second footpeg such that when the first footpeg and second footpeg are pivotally coupled to the two-wheel vehicle, the distal end of the first footpeg becomes closer to the reference point of the seat of the two-wheeled vehicle when the distal end of the second footpeg becomes farther from the reference point of the seat of the two-wheeled vehicle, wherein the first footpeg and the second footpeg are coupled so that when the first footpeg and second footpeg are pivotally coupled to the two-wheel vehicle, when a first force is being imparted on the first footpeg, and a second force is being imparted on the second footpeg then the first force opposes the second force upon the second footpeg and the second force opposes the first force upon the first footpeg; and (III) a cable having a first end and a second end, wherein when the first footpeg is pivotally coupled with the two-wheeled vehicle, the first footpeg is coupled with first end of the cable, and wherein when the second footpeg is pivotally coupled with the two-wheeled vehicle, the second footpeg is coupled with the second end of the cable.

11. The two-wheeled vehicle footpeg elevational system of claim 10, further including at least one pulley member couplable with the two-wheeled vehicle, wherein when the first footpeg is pivotally coupled with the two-wheeled vehicle, when the second footpeg is pivotally coupled with the two-wheeled vehicle, and when the at least one pulley member is coupled with the two-wheeled vehicle, the cable is movably coupled with the at least one pulley member.

12. The two-wheeled vehicle footpeg elevational system of claim 10, further including
a first spring force mechanism coupled to the first footpeg and couplable to the two-wheeled vehicle, and
a second spring force mechanism coupled to the second footpeg and couplable to the two-wheeled vehicle,
wherein when the first footpeg is pivotally coupled with the two-wheeled vehicle, when the second footpeg is pivotally coupled with the two-wheeled vehicle, when the first spring force mechanism is coupled with the two-wheeled vehicle, and when the second spring force mechanism is coupled with the two-wheeled vehicle then when a first force is being imparted on the first footpeg then the first spring force mechanism imparts a first counter force opposing the first force and when a second force is being imparted on the second footpeg then the second spring force mechanism imparts a second counter force opposing the second force.

13. A two-wheeled vehicle footpeg elevational system for a two-wheeled vehicle including a seat with a reference point, the two-wheeled vehicle footpeg elevational system comprising:
(I) a first footpeg pivotally couplable to the two-wheeled vehicle, the first footpeg including a distal end;
(II) a second footpeg pivotally couplable to the two-wheeled vehicle, the second footpeg including a distal end,
wherein the first footpeg is coupled with the second footpeg such that when the first footpeg and second footpeg are pivotally coupled to the two-wheel vehicle, and when a first force is being imparted on the first footpeg, and a second force is being imparted on the second footpeg then the first force opposes the second force upon the second footpeg and the second force opposes the first force upon the first footpeg; and
a cable having a first end and a second end,
wherein when the first footpeg is pivotally coupled with the two-wheeled vehicle, the first footpeg is coupled with first end of the cable, and
wherein when the second footpeg is pivotally coupled with the two-wheeled vehicle, the second footpeg is coupled with the second end of the cable.

14. The two-wheeled vehicle footpeg elevational system of claim 13, further including
at least one pulley member couplable with the two-wheeled vehicle,
wherein when the first footpeg is pivotally coupled with the two-wheeled vehicle, when the second footpeg is pivotally coupled with the two-wheeled vehicle, and when the at least one pulley member is coupled with the two-wheeled vehicle, the cable is movably coupled with the at least one pulley member.

* * * * *